(12) United States Patent
Diamant et al.

(10) Patent No.: US 11,314,842 B1
(45) Date of Patent: Apr. 26, 2022

(54) HARDWARE IMPLEMENTATION OF MATHEMATICAL FUNCTIONS

(71) Applicant: Amazon Technologies, Inc., Seattle, WA (US)

(72) Inventors: Ron Diamant, Santa Clara, CA (US); Randy Renfu Huang, Morgan Hill, CA (US); Mohammad El-Shabani, Seattle, WA (US); Sundeep Amirineni, Austin, TX (US); Kenneth Wayne Patton, Bee Cave, TX (US); Willis Wang, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/987,830

(22) Filed: Aug. 7, 2020

Related U.S. Application Data

(63) Continuation of application No. 16/219,604, filed on Dec. 13, 2018, now Pat. No. 10,740,732.

(51) Int. Cl.
*G06F 17/14* (2006.01)
*G06F 7/544* (2006.01)
*G06F 16/84* (2019.01)
*G06F 7/52* (2006.01)
*G06F 7/50* (2006.01)

(52) U.S. Cl.
CPC .............. *G06F 17/14* (2013.01); *G06F 7/544* (2013.01); *G06F 16/86* (2019.01); *G06F 7/50* (2013.01); *G06F 7/52* (2013.01); *G06F 2207/5354* (2013.01)

(58) Field of Classification Search
CPC . G06F 17/14; G06F 7/544; G06F 7/52; G06F 7/50; G06F 16/86; G06F 2207/5354
USPC ................................. 708/270–277, 400, 440
See application file for complete search history.

(56) References Cited

U.S. PATENT DOCUMENTS

| | | | | |
|---|---|---|---|---|
| 4,905,177 A | * | 2/1990 | Weaver, Jr | G06F 1/0356 708/276 |
| 6,640,237 B1 | * | 10/2003 | Genrich | G06F 1/0356 708/276 |
| 7,890,562 B2 | * | 2/2011 | Gross | G06F 1/0328 708/276 |
| 8,200,728 B2 | * | 6/2012 | Michaels | G06F 1/03 708/276 |

(Continued)

OTHER PUBLICATIONS

U.S. Appl. No. 16/219,604, "Notice of Allowance", dated Mar. 27, 2020, 10 pages.

*Primary Examiner* — Tan V Mai
(74) *Attorney, Agent, or Firm* — Kilpatrick Townsend & Stockton LLP

(57) ABSTRACT

Methods and systems for performing hardware computations of mathematical functions are provided. In one example, a system comprises a mapping table that maps each base value of a plurality of base values to parameters related to a mathematical function; a selection module configured to select, based on an input value, a first base value and first parameters mapped to the first base value in the mapping table; and arithmetic circuits configured to: receive, from the mapping table, the first base value and the first plurality of parameters; and compute, based on a relationship between the input value and the first base value, and based on the first parameters, an estimated output value of the mathematical function for the input value.

18 Claims, 14 Drawing Sheets

(56) References Cited

U.S. PATENT DOCUMENTS

| | | | |
|---|---|---|---|
| 2005/0004965 A1* | 1/2005 | Coleman | G06F 1/0356 708/490 |
| 2014/0067889 A1* | 3/2014 | Mortensen | G06F 7/60 708/201 |
| 2017/0169132 A1 | 6/2017 | Hossack et al. | |
| 2020/0007718 A1 | 1/2020 | Lee | |

* cited by examiner

HARDWARE IMPLEMENTATION OF MATHEMATICAL FUNCTIONS

CROSS-REFERENCE TO RELATED APPLICATIONS

This application is a Continuation of U.S. Pat. No. 10,740,432, granted Aug. 11, 2020, and entitled "Hardware Implementation of Mathematical Functions," the content of which is herein incorporated by reference in its entirety.

BACKGROUND

Artificial neural networks are computing systems with an architecture based on biological neural networks. Artificial neural networks can be trained, using training data, to learn about how to perform a certain computing task.

A neural network may include a set of processing nodes. Each processing node can process a piece of the input data based on a weight to generate an output. The outputs can be processed using an activation function to generate a decision. A neural network may be implemented by a neural network processor including, for example, circuitries and data paths, part of which can be used to implement the activation functions. The throughput and accuracy of the neural network processing may depend on how the activation functions are implemented in the neural network processor or other hardware components used for the neural network processing.

BRIEF DESCRIPTION OF THE DRAWINGS

Various embodiments in accordance with the present disclosure will be described with reference to the drawings, in which.

DETAILED DESCRIPTION

Figure 1:
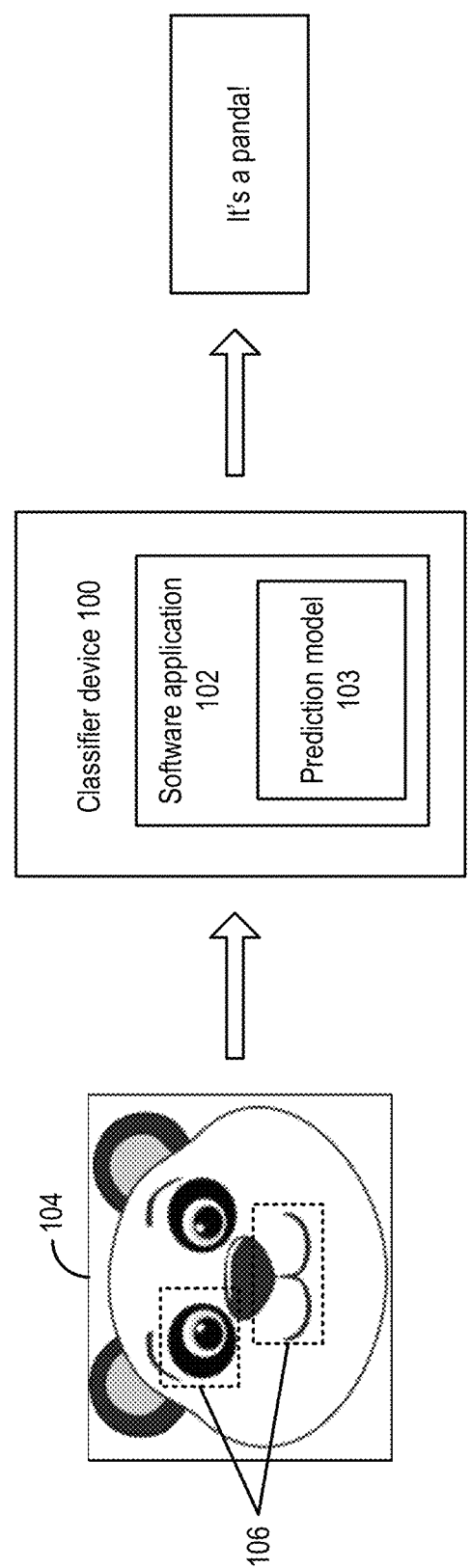
FIG. 1 illustrates an example classifier device that uses techniques disclosed herein to process data.

Examples of the present disclosure relate to hardware implementation of a mathematical function which can be used, for example, for neural network processing. In one example, a system comprises a programmable mapping table that maps each input boundary value of a plurality of input boundary values to parameters related to a mathematical function. The system also includes a selection module configured to select, based on an input value, a first input boundary value and first parameters mapped to the first input boundary value in the programmable mapping table. The system further includes arithmetic circuits configured to receive, from the mapping table, the first input boundary value and the first plurality of parameters. The arithmetic circuits can compute, based on a relationship between the input value and the first input boundary value, and based on the first parameters, an estimated output value of the mathematical function for the input value. In some examples, the system can be part of a neural network processor and can be used to implement an activation function for neural network processing. The system can receive intermediate values of a neural network layer as inputs, select the input boundary values and activation function parameters mapped to the input boundary values based on the inputs, and compute estimated output values of the activation functions for the intermediate values.

An artificial neural network (herein after "neural network") may include multiple processing nodes. The processing nodes can be divided into layers including, for example, an input layer, a number of intermediate layers (also known as hidden layers), and an output layer. Each processing node of the input layer receives an element of an input set and scales the element with a weight to indicate the element's degree of influence on the output. The processing nodes in the intermediate layers may combine the scaled elements received from each processing node of the input layer to compute a set of intermediate outputs. For example, each processing node in the intermediate layers may compute a sum of the element-weight products and then generate an intermediate output by applying an activation function to the sum. The intermediate outputs from each processing node of one intermediate layer may be considered as an activated vote (or no-vote), associated with a weight indicating the vote's influence, to determine the intermediate output of the next intermediate layer. The output layer may generate a binary output (e.g., "yes" or "no") based on the activated votes (or no-votes) and their associated weights.

To improve the speed of neural network processing, the computations of an artificial neural network can be performed using hardware components, such as a neural network processor. The neural network processor can include a systolic array to perform arithmetic operations to generate the element-weight products and the sums of the element-weight products. The neural network processor may also include hardware circuitries, such as multiplexor circuitries configured as a lookup table (LUT), to implement the activation function processing. For example, the LUT can map a set of discrete candidate inputs (of an input range) to a set of discrete candidate outputs, with each candidate output representing a result of processing a corresponding candidate input with the activation function. To apply the activation function on a sum of element-weight products, the input can be quantized to one of the candidate inputs, which the mapping table can then map to one of the candidate outputs.

Although the deployment of lookup table can speed up activation function processing, the speed improvement is achieved at the cost of reduced accuracy. For example, the quantization of the input to one of the candidate inputs introduces quantization error and the quantization error is translated to an output error when the mapped candidate output does not equal to the exact output value the activation function would have generated by processing the actual input. The quantization error can be reduced by expanding the lookup table to map a larger set of discrete candidate inputs (of the same input range) to a larger set of corresponding discrete candidate outputs. But the expansion increases the complexity of the multiplexor circuitries, which in turn limits the number of discrete candidate inputs and the improvement in quantization error. Moreover, the accuracy of an LUT, once created, is fixed based on the number of discrete candidate inputs and cannot be changed. Such inherent inflexibility can limit further improvement in the accuracy of the activation function processing, or potential improvement in the speed of the activation function processing if accuracy can be reduced to trade off for speed.

Examples of the present disclosure relate to hardware implementation of mathematical functions. Examples of such functions include activation functions, which can be used for neural network processing. In one example, a system comprises a programmable mapping table that maps each input boundary value of a plurality of input boundary values to parameters related to a mathematical function, such as an activation function. The system also includes a programmable selection module configured to select, based on an input value, a first input boundary value and first parameters mapped to the first input boundary value in the programmable mapping table. The system further includes arithmetic circuits configured to receive, from the programmable mapping table, the first input boundary value and the first plurality of parameters. The arithmetic circuits can compute, based on a relationship between the input value and the first input boundary value, and based on the first parameters, an estimated output value of the mathematical function for the input value. In some examples, the system can be part of a neural network processor to implement an activation function. The system can receive intermediate values of a neural network layer as inputs, select the input boundary values and activation function parameters mapped to the input boundary values based on the inputs, and compute estimated output values of the activation functions for the intermediate values.

Compared with the aforementioned LUT approach, examples of the present disclosure use a two stage process to first map an input to a set of function parameters using the mapping table, and then compute the estimated activation function output for that input based on the mathematical function parameters using arithmetic circuits, which can improve the accuracy in the activation function processing. For example, the accuracy of the processing is no longer dominated by the number of input boundary values, and the resulting quantization errors and the accuracy can be improved based on the mathematical function parameters which approximate the input-output relationship of the mathematical function between adjacent input boundary values. For example, depending on the linearity of the activation function between adjacent input boundary values, the mathematical function parameters can include a rate of change (e.g., a slope) measurement, a set of coefficients representing a Taylor series expansion, etc. The input boundary values and the mathematical function parameters can be programmed into the mapping table based on the activation function and the mapping table can be programmed to implement different activation functions based on different sets of input boundary values and function parameters.

In addition, the programmability of the mapping table also allows tradeoff between speed and accuracy. For example, to improve accuracy, the entire mapping table can be used to store more fine-grained input boundary values and the associated function parameters of a single activation function. In a case where accuracy can be reduced, the mapping table can be partitioned among a plurality of activation functions, with each partition to store a reduced number of coarse-grained input boundary values and the associated function parameters of an activation function. Storing a plurality of activation functions in the mapping table can improve the processing speed by, for example, avoiding or reducing the delays in loading a new activation function for different neural network layers. In some examples, techniques such as non-uniform quantization can also be applied in the programming of the input boundary values and the associated function parameters to further improve the accuracy of activation function processing. For example, as part of the programming, more fine-grained input boundary values can be mapped to regions of the mathematical function with a high rate of change, whereas more coarse-grained input boundary values can be mapped to regions of the mathematical function with low rate of change. All these can improve the operation flexibility of a neural network processor, as well as the speed and/or accuracy of neural network processing.

In the description herein, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates an example classifier device 100 that uses techniques disclosed herein to process data. Classifier device 100 can be, for example, a computing device operating a software application 102 and a prediction model 103 to predict information included in a data sequence, and perform a pre-determined function based on the prediction. For example, classifier device 100 can be part of an image recognition service provided to identify certain objects (e.g., texts, a person, etc.) from an image. It is understood that the image recognition service is merely provided as an illustrative example, and that techniques disclosed herein can be used for other data processing applications including, for example, text-based data processing (e.g., processing of search queries), audio data processing, etc. Moreover, classifier device 100 may operate a number of different prediction models to process different input data, either in parallel or at different times.

In some examples, the image recognition service can be provided in a multi-tenant compute service system. The multi-tenant compute service system may typically include a plurality of servers that can host data and be used by multiple clients or organizations to run instances, such as virtual machine instances or bare-metal instances (e.g., operating systems that run directly on the server hardware). In most cases, instances, such as bare-metal or virtual machine instances, a multi-tenant compute service system may be allocated to a client when the client needs them and decommissioned when they are no longer needed, such that the resources can be reallocated to other clients. In the present disclosure, the terms "tenant," "client," and "customer" may be used interchangeably, although such terms do not necessarily imply the existence of any particular business arrangement. For example, the term "instance" may refer to, for example, an instance that is executed directly on server hardware or as a virtual machine. Different types of instances generally correspond to different hardware functions and/or arrangements of hardware (e.g., different amounts of available memory and/or processing hardware). In the example of FIG. 1, the multi-tenant compute service system may provide the image recognition service when the client needs it and decommissioned when it is no longer needed, such that the resources supporting the image recognition service (e.g., access to software application 102, and the underlying hardware resources for processing software application 102) can be reallocated to other clients. Different clients (or one client) may request software application 102 to perform processing of different input data using the same or different prediction models including prediction model 103.

In the example of FIG. 1, software application 102 can receive pixel data of an image 104 from a user. Image 104 may include an array of pixels. Software application 102 can perform analysis on the pixel data, and predict one or more objects 106 depicted in image 104. The analysis may include, for example, comparing the pixel data against a set of pre-determined features data. The pre-determined features data may include data associated with a set of pre-determined visual image features such as, for example, a nose object, a mouth object, etc. The pre-determined features data may also include data associated with non-visual image features, or a combination of visual and non-visual image features. As to be discussed in more detail below, software application 102 may employ prediction model 103 to compute a set of scores based on the pixel data of image 104. The set of scores may represent, for example, the likelihood of image 104 including the image features represented by the features data. Software application 102 can then determine other information about the content of image 104 based on the scores. For example, based on the scores, software application 102 can determine that image 104 is an image of, for example, a panda, a cat, or other objects. The present disclosure provides examples of techniques to allow allocation and placement of resources for deployment of prediction model 103 to be performed at different times and by different systems, which can expedite the operations of software application 102, as to be discussed below.

Prediction model 103 can be in the form of an artificial neural network. The artificial neural network may include a plurality of processing nodes, with each processing node configured to process part of the input pixel data, or to further process the intermediate outputs from other processing nodes. FIG. 1 illustrates an example of prediction model 103 that uses techniques disclosed herein. In FIG. 1, prediction model 103 may be a multi-layer neural network such as a deep neural network (DNN), a convolutional neural network (CNN), etc. Prediction model 103 may include an input layer 207, a set of intermediate layers including intermediate layers 209 and 211, and an output layer (not shown in FIG. 2A). It is understood that prediction model 103 can also include other different types of neural networks including, for example, long short-term memory (LSTM), multilayer perception (MTP), multiscale densenet, etc.

Layer 207 may process pixel data representing different portions of image 104. For example, in the example of FIG. 2A, layer 207 may process the pixel data of image 204. Each processing node of layer 207 is assigned to receive a pixel value (e.g., $x_0, x_1, x_2, \ldots x_n$) corresponding to a pre-determined pixel within image 104, and transmit one or more weights with the received pixel value to layer 209. In a case where prediction model 203 is a DNN, each processing node of layer 207 can be assigned a set of weights defined based on a matrix W1 Each processing node of layer 207 can send the received pixel value and the assigned weights to each processing node of layer 209. In a case where prediction model 103 is a CNN, groups of the processing nodes of layer 207 may share a set of weights, and each group may send the set of weights and the pixel values received by the group of processing nodes to a single processing node of layer 209. Different neural network models may include different topologies (e.g., including different number of layers, different connections between layers, etc.), and/or include a different set of weights for each layer.

Layer 209 may process the scaled outputs from layer 207 to generate a set of intermediate outputs. For example, assuming processing node 210a of layer 209 is connected to n processing nodes in layer 207, processing node 210a may generate a sum of the scaled outputs received from layer 207 based on the following equation:

$$\text{sum}_{210a} = \Sigma_{i=0}^{n}(W1_i \times x_i) \qquad \text{(Equation 1)}$$

Here, $\text{sum}_{210a}$ represents a sum generated by processing node 210a. $W1_i \times x_i$ represents a scaling of a particular pixel value (e.g., $x_0$) with the associated weight (e.g., $W1_0$) by a processing node of layer 207. In a case where prediction model 103 is a DNN, each processing node of layer 209 may generate the sum based on the scaling of pixel values from each processing node of layer 207, and then generate a sum (e.g., $\text{Sum}_{210a}$) by summing the scaled pixel values. The sum may also represent a dot-product between an input vector comprising a number of elements (e.g., pixel values) and a weight vector (e.g., W1).

In a case where prediction model 103 is a CNN, each processing node of layer 209 may generate the sum based on the scaling of pixel values from a group of processing nodes of layers 207. The sum may represent a convolution result between a group of pixel values and a filter comprising the weight values. FIG. 2B illustrates an example of a convolution operation layer 209 may perform. In FIG. 2B, filter 230 may include a two-dimensional array of weights. The weights in filter 230 may represent a spatial distribution of pixels for certain features to be detected from the image. The two-dimensional array may have a height of R rows and a width of S columns, and is typically smaller than an input image with a height of H pixels and a width of W pixels. Each weight may be mapped to a pixel in a rectangular block of pixel values with the same R rows and S columns. A processing node of layer 209 (e.g., processing node 210a) can receive, from a group of processing nodes of input layer 207, a group 240 of pixel values corresponding to a first rectangular block of pixels from the input image, and generate a convolution output 242 based on a summation of multiplication results between each weight of filter 230 and each corresponding pixel in group 240 according to Equation 1, to generate a dot-product between a matrix represented by filter 230 and a matrix represented by group 240. Another processing node of layer 209 can also receive, from another group of processing nodes of input layer 207, a group 244 of pixel values corresponding to a second rectangular block of pixels from the input image, and generate a convolution output 246 based on a summation of multiplication results between each weight of filter 230 and each corresponding pixel in group 244 according to Equation 1, to generate a dot-product between the matrix of filter 230 and a matrix represented by group 240. In some examples, each convolution output in FIG. 2B (e.g., convolution output 242, convolution output 346, etc.) can correspond to the output of a processing node of layer 309. In some examples, the pixel data in the input image may be referred to as an input feature map to indicate that the pixels are processed by the same filter (or same sets of filters) corresponding to certain feature(s). The convolution outputs may be referred to as an output feature map to indicate that the output is the result of processing an input feature map with the filter.

As shown in FIG. 2B, the convolution operations can be arranged in a sliding-window such that the second rectangular block overlaps, or is otherwise adjacent to, the first rectangular block in the input image. For example, in the example of FIG. 2B, D may be a distance of stride (in pixel) of the sliding-window for each convolution operations, such that the block of pixels corresponding to group 244 may be situated at a distance D (in terms of pixels) from the block of pixels corresponding to group 240, and the next block of pixels may also be situated at the same distance D from group 244. Other processing node of layer 209 may also receive groups of pixels corresponding to other rectangular blocks and generate other intermediate outputs. The convolution outputs can be part of a convolution output array. The array of convolution outputs can have a smaller height and a smaller width than the input image. Rectangular blocks of the convolution outputs can be further grouped, and convolution operations can be performed at layer 211 between the groups of convolution outputs and another set of filter weights to generate another set of convolution outputs.

Referring back to FIG. 2A, one processing node of layer 209 may be configured to generate the convolution output elements of one convolution output array, and a set M of processing nodes of layer 209 can correspond to a set M of convolution output arrays. The processing node of layer 209 can also process each convolution output with an activation function to generate an activation output. The activation function may translate the convolution output into a decision of whether to forward the convolution output to intermediate layer 211 to influence the classifier decision (analogous to the firing of a biological neuron). An example of the activation function can be a rectified linear unit (ReLU) defined according to the following equation:

$$\text{ReLU}(y) = \max(0, y) \quad \text{(Equation 2)}$$

In addition to ReLU, other forms of activation function can also be used including, for example, a softplus function (which can be a smooth approximation of a ReLU function), a hyperbolic tangent function (tanh), an arc tangent function (arctan), a sigmoid function, a Gaussian function, etc.

A processing node of layer 209 (e.g., processing node 210a) may process the sum with the ReLU function to generate a first intermediate output based on the following equation:

$$\text{first\_intermediate\_output}_{210a} = \text{ReLU}(\text{Sum}_{210a}) \quad \text{(Equation 3)}$$

In a case where prediction model 103 is a CNN, prediction model 103 may include a pooling layer (not shown in FIG. 2A) to reduce the size of the first intermediate outputs. For example, the pooling layer may perform a down-sampling operation and forward a maximum intermediate output (generated based on the ReLU function) among a group of intermediate outputs (while discarding the rest of the intermediate outputs in the group) to layer 211.

Layer 211 may further process the scaled intermediate outputs from layer 209 by, for example performing additional convolution operations based on different sets of filters. The outputs from each processing node of layer 211 may be forwarded to other higher intermediate layers, or to an output layer (not shown in FIG. 2A). The output layer may form an output vector representing, for example, a probability that certain features are included in image 104, and/or a probability that image 104 includes an image of a panda. For example, the output vector may be compared against a reference vector associated with a nose object of a panda, or a reference vector associated with a panda. A decision about whether image 104 is an image of a panda can be determined based on the comparison result.

Figure 2A:
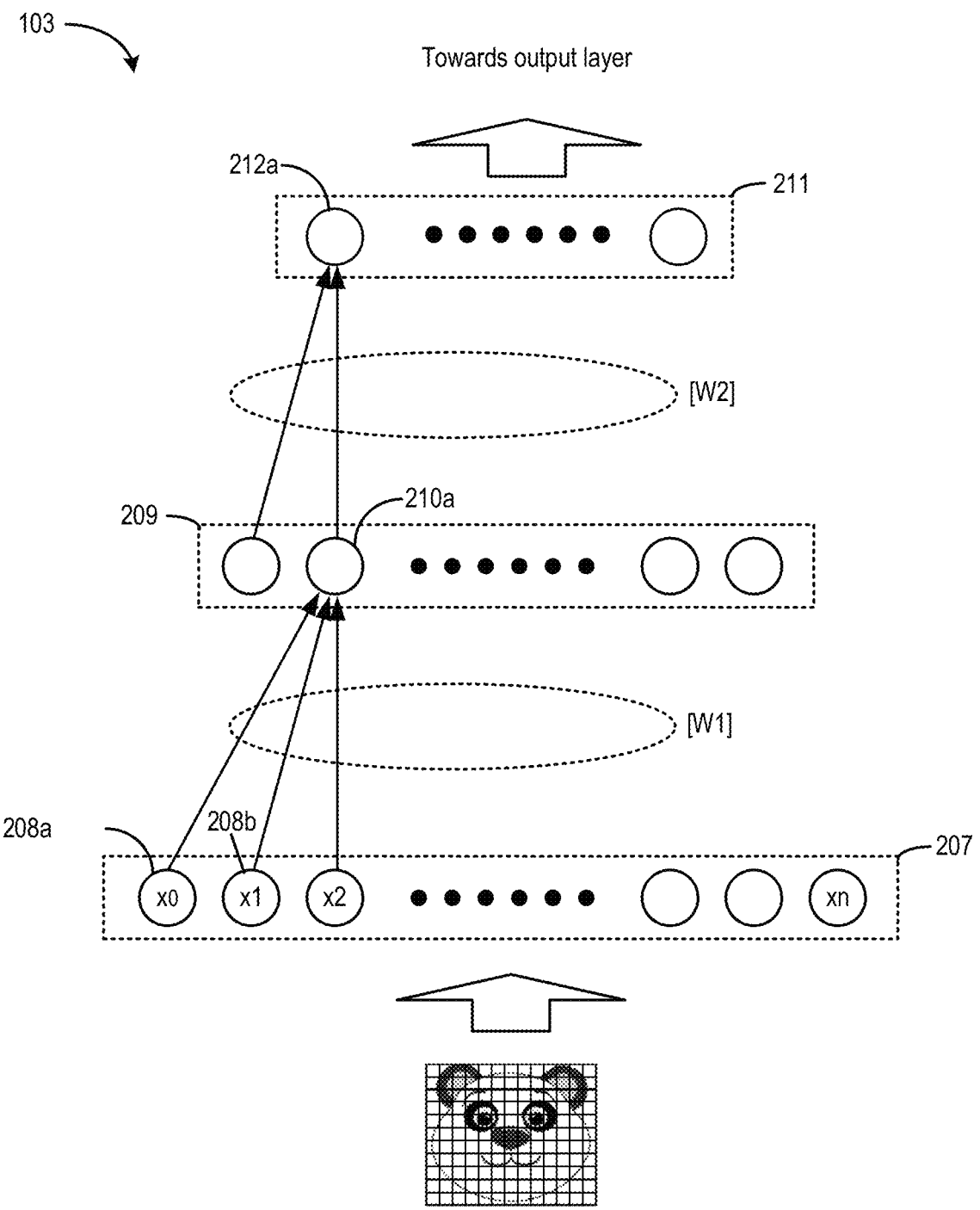
FIGS. 2A-2C illustrate simplified block diagrams illustrating a prediction model and the computations that use techniques disclosed herein, according to certain aspects of the present disclosure.
Figure 2B:
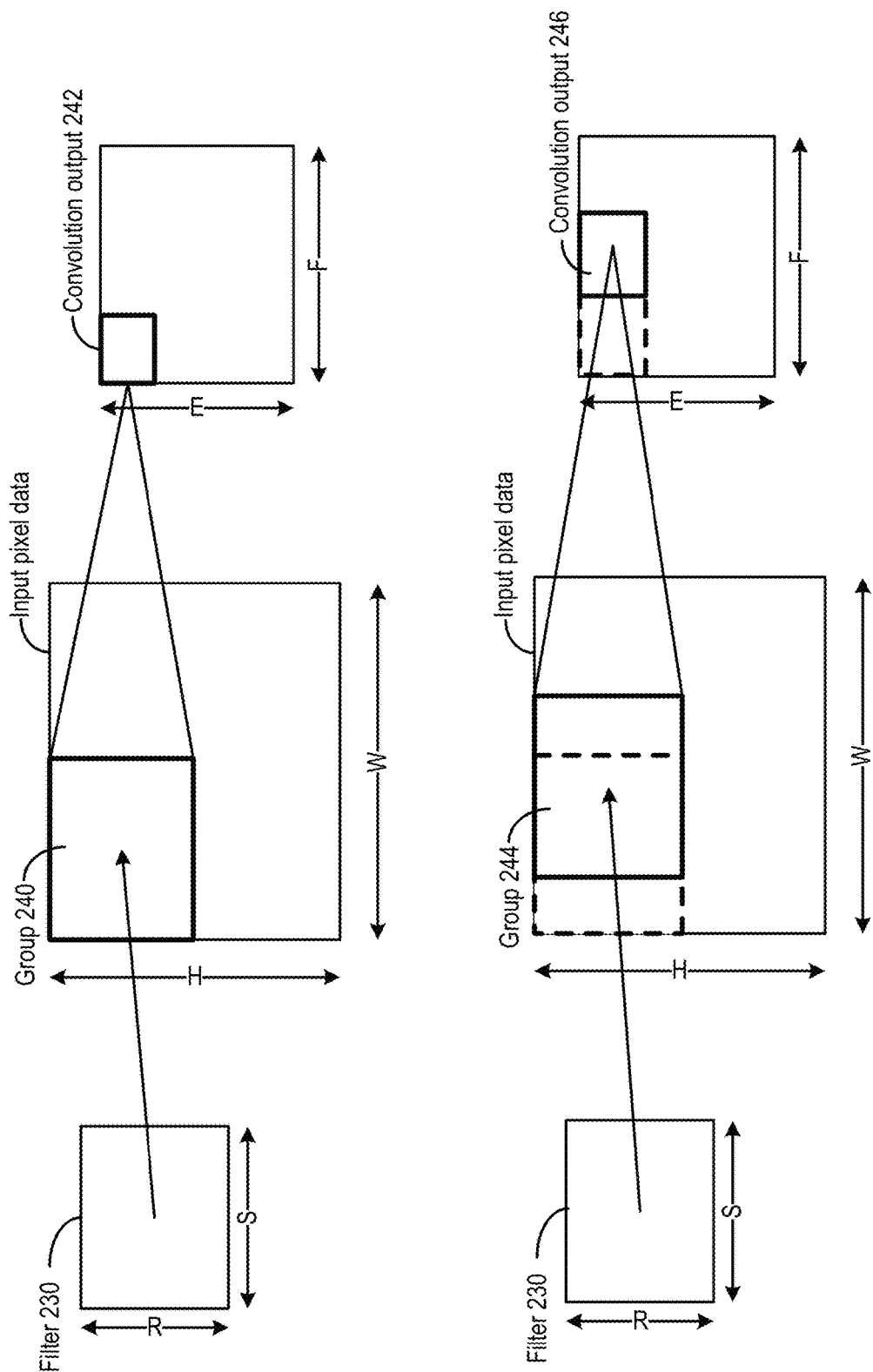
Figure 2C:
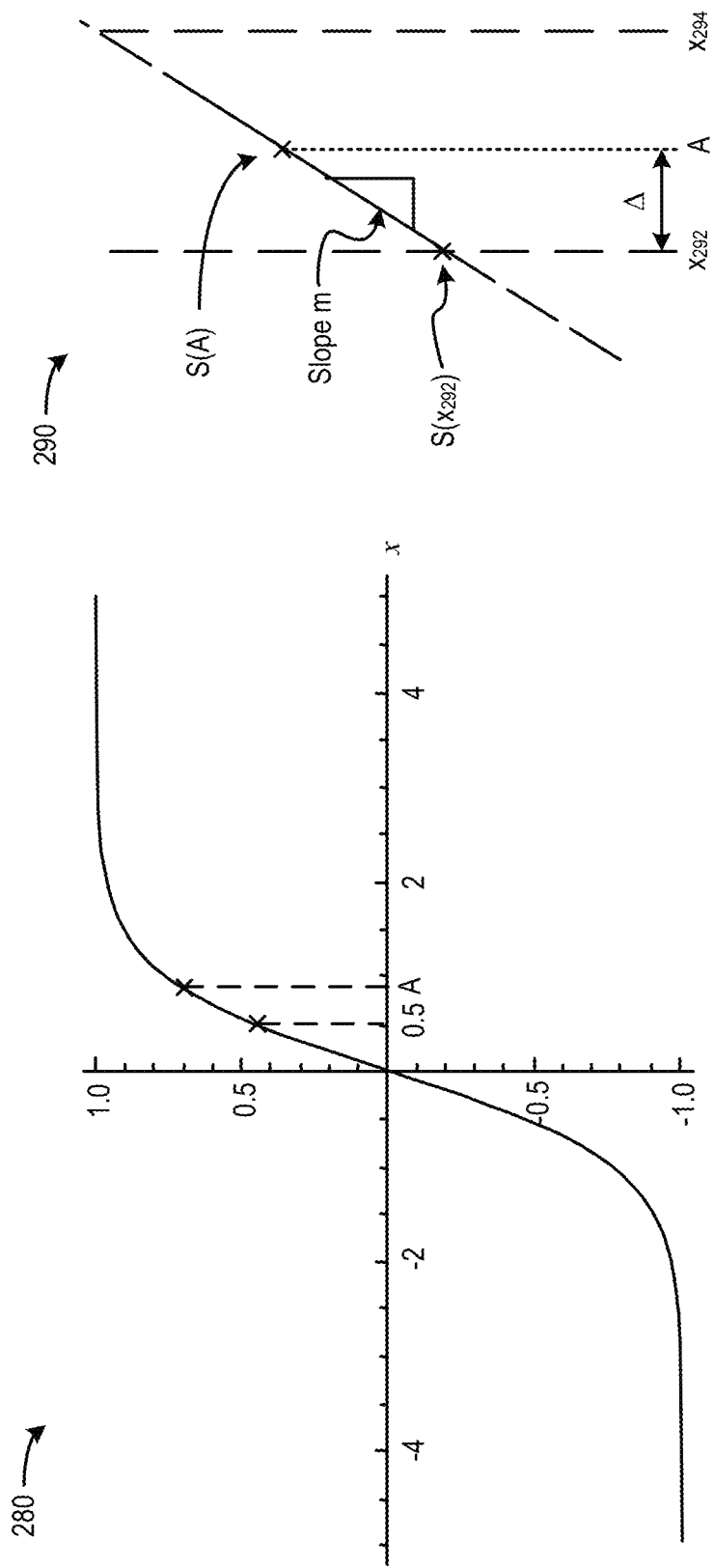

FIG. 2C illustrates an example of a sigmoid function which can be used as an activation function in prediction model 103 of FIG. 2A. Graph 280 on the left illustrates an example of a sigmoid function S(x), which can be defined according to the following equation:

$$S(x) = \frac{e^x}{1 + e^x} \quad \text{(Equation 4)}$$

In Equation 4, $e^x$ refers to an exponential function. The sigmoid function can accept an infinite input range, but as shown in FIG. 2C, for an input larger than 3 or less than −3, the output of sigmoid function is essentially flat and does not change with the input.

There are different ways to compute the value of S(x) for a particular value of x. In one example, the value of exponential function $e^x$ of the numerator can be computed, based on which the denominator $1+e^x$ can also be computed, followed by the ratio between the numerator and the denominator. In another example, the entire input range to the sigmoid function can be divided into a plurality of input subranges, and the values of the sigmoid function corresponding to the plurality of input subranges can be pre-computed and stored in a mapping table. Each input subrange can be defined by a pair of input boundary values. The value of the sigmoid function for each input subrange can be evaluated at a base value representing the input subrange, and mapped to that base value in the mapping table. The base value may include, for example, one of the input boundary values of the input subrange, or any point within the input subrange (e.g., a mid-point). For an input that matches a base value stored in the mapping table, a value of S(x) can be retrieved from the mapping table. For an input (denoted as 'A' in FIG. 2C) that does not match any of the base values in the mapping table, a value of S(x) for that input can be computed based on a process of extrapolation.

Graph 290 of FIG. 2C illustrates an example process of extrapolation to estimate the value of S(x) at input A. As shown in graph 290, two input boundary values (denoted as "$x_{292}$" and "$x_{294}$") that define an input subrange including input A can be determined. The value of S(x) at input A can be extrapolated from the value of S(x) at one of input boundary values $x_{292}$ or $x_{294}$ which acts as a base value. For example, to extrapolate from the base value of input boundary value $x_{292}$, a difference $\Delta$ can be determined between input A and input boundary value $x_{292}$, and a slope (denoted "m") of S(x) can be determined at input boundary value $x_{292}$. The value of S(x) at input A can be estimated based on the following equation:

$$\text{Estimated } S(A) = S(x_{292}) + m \times \Delta \quad \text{(Equation 5)}$$

In Equation 5, the value of S(A) can be estimated by first estimating a change from $S(x_{292})$ (which represents value of S(x) at $x_{292}$) to S(A). The estimation can be performed by multiplying the slope m (which indicates the rate of change of S(x) at $x_{292}$) and $\Delta$ (which represents the difference between A and $x_{292}$). The estimated change can then be added to $S(x_{292})$ to obtain the estimation of S(A).

In some examples, the estimation of S(A) can also be based on a Taylor series expansion based on the following equation:

$$\text{Estimated } S(A) = S(x_{292}) + \sum_{n=1}^{\infty} \left( \frac{S^n(x_{292})}{n!} \times \Delta^n \right) \quad \text{(Equation 6)}$$

In Equation 6, "n!" represents a factorial of n, "$S''(x_{292})$" represents an n-th degree derivative of S(x) evaluated at input boundary value $x_{292}$, whereas $\Delta^n$ refers to raising the difference (between input A and input boundary value $x_{292}$) to the power n.

In some examples, a Taylor series expansion up to the third degree (n=3) may provide sufficient accuracy in estimating the value of S(A). Equation 6 can be rewritten as follows:

$$\text{Estimated } S(A) = S(x_{292}) + S^1(x_{292}) \times \Delta + \frac{S^2(x_{292})}{2} \times \Delta^2 + \frac{S^3(x_{292})}{6} \times \Delta^3 \quad \text{(Equation 7)}$$

Equation 7 can be further rewritten as follows:

$$\text{Estimated } S(A) = S(x_{292}) + ((I \times A + J) \times A + K) \times A \quad \text{(Equation 8)}$$

In Equation 8, parameter I can represent the Taylor series coefficient $S^3(x_{292})/6$, parameter J can represent the Taylor series coefficient $S^2(x_{292})/2$, whereas parameter K can represent the Taylor series coefficient $S^1(x_{292})$.

Although FIG. 2C illustrates extrapolation operation from an input boundary value (e.g., $x_{292}$), the extrapolation operation can also be performed relative to a base value between the input boundary values, such as a mid-point, as described above.

As to be described in more details below, a programmable mapping table can be used as part of a neural network processor (or in conjunction with a neural network processor) to provide an estimation of an activation function based on Equations 6-8.

Figure 3:
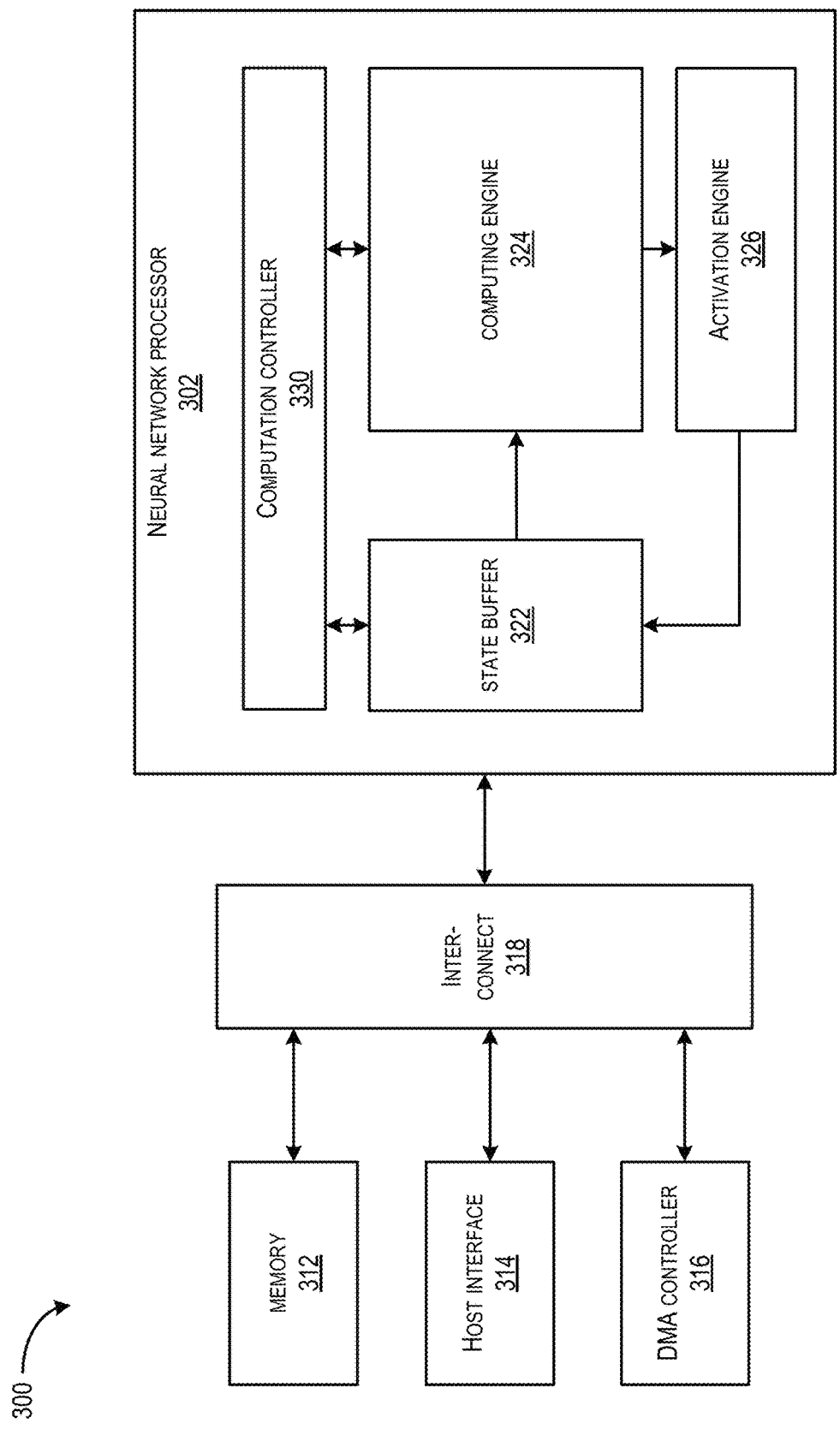
FIG. 3 illustrates simplified block diagrams for some of the components of an apparatus for implementing the prediction model of FIGS. 2A-2E, according to certain aspects of the present disclosure.

FIG. 3 shows an apparatus 300 according to some embodiments of the present disclosure. Apparatus 300 may be part of a computer system, e.g., a host server. Apparatus 300 may be part of a multi-tenant compute service system and can communicate with a host device (not shown in FIG. 3) to provide computing and memory resources for a computing service. For example, referring back to FIG. 1, apparatus 300 may provide computing and memory resources for computations with prediction model 103. A host device can operate software application 102 and communicate with apparatus 300 to perform one or more image recognition tasks based on computations with prediction model 103. The host device may transmit multiple image data sets associated with multiple contexts, and provide the multiple image data sets to apparatus 300, which can generate multiple outputs to predict, for example, whether each of the multiple image data sets includes a pre-determined object.

In the example of FIG. 3, apparatus 300 may include a neural network processor 302 coupled to memory 312, a direct memory access (DMA) controller 316, and a host interface 314 via an interconnect 318. As to be discussed in more details, neural network processor 302 can provide the computing resources to support the computations with prediction model 103. Neural network processor 302 can include an integrated circuit such as, for example, a System-on-Chip (SoC). Memory 312 may be configured to store the instructions, input data (e.g., pixel groups 249 and 244 of FIG. 2B) and the weights (e.g., filter 230) received from the host device. Memory 312 may also be configured to store the output of neural network processor 302 (e.g., convolution outputs 242 and 246 of FIG. 2B). Memory 312 may include any suitable memory, e.g., dynamic random access memory (DRAM), synchronous DRAM (SDRAM), double data rate DRAM (DDR DRAM), storage class memory (SCM), flash memory devices, etc.

DMA controller 316 may be configured to perform DMA operations to transfer data between neural network processor 302 and the host device. For example, as discussed above, the host device can store the instructions, input data, and the weights at memory 312. The host device can provide the memory addresses for the stored instructions, data and weights to neural network processor 302 (e.g., in the form of memory descriptors). Neural network processor 302 can then obtain the stored instructions, data, and weights based on the memory addresses provided by the host device. Neural network processor 302 can also store the results of computations (e.g., one or more image recognition decisions) at memory 312, and provide the memory addresses for the stored results to the host device.

Host interface 314 may be configured to enable communication between the host device and neural network processor 302. For example, host interface 314 may be configured to transmit the memory descriptors including the memory addresses of the stored data (e.g., input data, weights, results of computations, etc.) between the host device and neural network processor 302. Host interface 314 may include, for example, a peripheral component interconnect express (PCIe) interface or any suitable interface for communicating with the host device.

Neural network processor 302 can provide the computing resources to support the computations with one or more instances of prediction model 103. In the example of FIG. 3, neural network processor 302 may include a state buffer 322, a computing engine 324, an output buffer 328, a post-processor 329, and a computation controller 330.

State buffer 322 may be configured to provide caching of data used for computations at computing engine 324. The data cached at state buffer 322 may include, for example, the input data and weights obtained acquired from memory 312, as well as intermediate outputs of computations at computing engine 324. The caching can reduce the effect of memory access bottleneck (e.g., caused by the latencies at memory 312, DMA controller 316, interconnect 318, etc.) on the performance of computing engine 324. State buffer 322 can be controlled by computation controller 330 to pre-fetch a set of weights to computing engine 324, and then fetch the input data as a sequential stream to computing engine 324, which performs the computations and generate a sequential stream of intermediate output data. The stream of intermediate output data can be collected at output buffer 328 and post-processed by post-processor 329. The post-processed stream of intermediate output data can be stored at state buffer 322. The intermediate output data can be stored at a different location in state buffer 322 from where the input data and weights are stored to avoid overwriting, for example, input data that are yet to be fetched to computing engine 324. State buffer 322 can be an on-chip memory device and may include, for example, static random access memory (SRAM).

Computing engine 324 may include a set of circuitries configured to perform one or more arithmetic operations involved in neural network computations. For example, computing engine 324 may include a set of multipliers to perform the scaling of input data with associated weights, and a set of adders to generate a sum of the results of multiplications representing dot-products and convolution results, as discussed above. Computing engine 324 may obtain the weights used for the scaling from state buffer 322. The outputs of computing engine 324 can be post-processed (e.g., filtered, combined, accumulated, etc.) at a post-processor (not shown in FIG. 3), and the post-processed outputs can be processed by activation engine 326 to generate the intermediate outputs for a neural network layer. The intermediate outputs can be written back into state buffer 322, which can then fetch the intermediate outputs to computing engine 324 for subsequent processing (e.g., the processing by the next neural network layer).

In some examples, computing engine 324 may be controlled by computation controller 330 to perform computations for different neural network layers sequentially, to reduce the sizes of the weights stored in state buffer 322. For example, computing engine 324 may be controlled to perform the arithmetic operations for one neural network layer (e.g., layer 207) within one time period, and then to perform the arithmetic operations for the next neural network layer (e.g., layer 209) in the next time period. Computation controller 330 can control state buffer 322 to pre-fetch weights of a neural network layer (and input data for the input neural network layer) from memory 312, and fetch the weights and input data for a neural network layer to computing engine 324 to perform computations for that neural network layer. Computation controller 330 can also configure activation engine 326 for that neural network layer based on, for example, setting a particular activation function for that neural network layer and setting a particular input range that for that neural network layer. After the computation for the neural network layer completes, computation controller 330 can control state buffer 322 to fetch another set of weights and input data for the next neural network layer to computing engine 324, and configure activation engine 326 (e.g., by setting a different activation function and/or setting a different input range) for the next neural network layer.

Figure 4A:
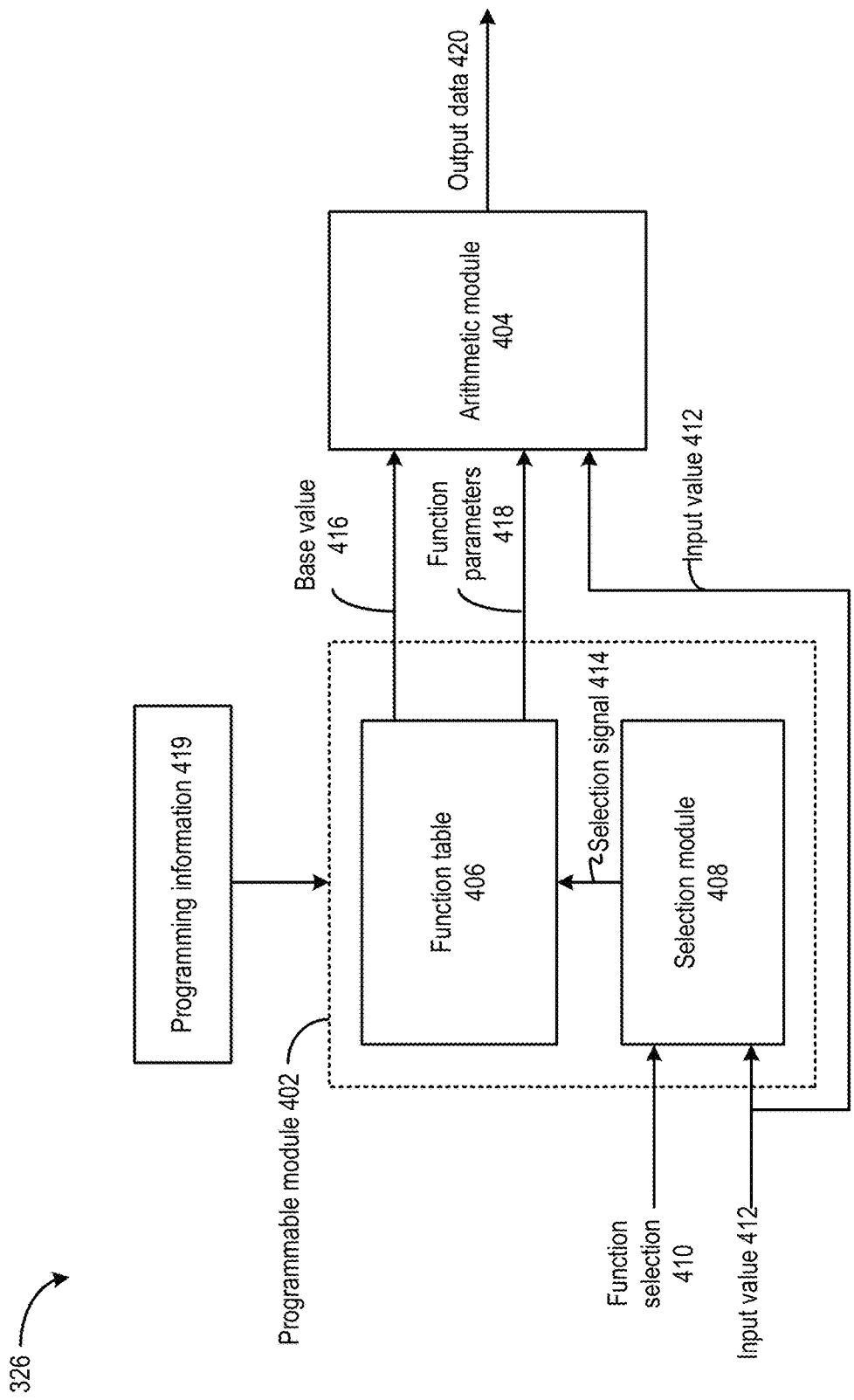
FIGS. 4A-4G illustrate simplified block diagrams of hardware implementation of mathematical functions that can be used in the apparatus of FIG. 3 for neural network processing, according to certain aspects of the present disclosure.

FIG. 4A-FIG. 4G illustrate examples of internal components of activation engine 326. As shown in FIG. 4A, activation engine 326 includes a programmable module 402 and an arithmetic module 404. Programmable module 402 includes a function table 406 and a selection module 408.

Function table 406 can store one or more mapping tables. Each of the mapping tables can represent an activation function, and each mapping table can map a set of base values to a set of parameters related to the activation function evaluated at the corresponding base values. Each base value can be an input boundary value of an input subrange, or a point within the input subrange (e.g., a mid-point). The set of parameters can include, for example, a value of the activation function at the corresponding base value, a change rate (e.g., a slope) of the activation function at the corresponding base value, a set of Taylor series coefficients of the activation function at the corresponding base value, etc.

Selection module 408 can accept a set of inputs including function selection 410 and input value 412 and generate a selection signal 414. Selection module 408 can forward selection signal 414 to function table 406 to select a base value 416 and a set of parameters 418 mapped to the base value. Parameters 418 can include, for example, a value of an activation function identified by function selection 410 at base value 416, as well as a change rate and/or a set of Taylor series coefficients of the activation function at base value 416.

Base value 416 and parameters 418, as well as input value 412, can be provided to arithmetic module 404, which include arithmetic circuitries (e.g., adders, multipliers, subtractors, etc.) to perform extrapolation operations based on, for example, Equations 5 to Equation 8 as described above to compute output data 420. Output data 420 can provide an estimated output of an activation function (selected based on function selection 410) when processing input value 412. In some examples, input value 412 may be extracted as the exponents of floating numbers representing a set of weighted sums generated by computing engine 324 for a neural network layer, and output data 420 can represent the intermediate output of that neural network layer.

In some examples, function table 406 includes a programmable memory device. The programmable memory device may include, for example, a set of registers, an SRAM device, a DRAM device, non-volatile memory devices such as storage class memory (SCM), etc. The programmable memory device can be organized into a plurality of buckets/entries including, for example, buckets 430 and 431. Each bucket can represent an input subrange and can be associated with an address (e.g., address 422 of bucket 430, denoted as "address0a") and each bucket can store a base value (e.g., base value 424, denoted as "x0a"), a set of parameters including an output value of an activation at the base value (e.g., function output value 426, denoted as "f(x0a)" in FIG. 4B), a slope and/or Taylor series coefficient at the base value (e.g., slope 428, denoted as "slope @ x0a"). The base value can be an input boundary value of the input subrange, a point within the input subrange, etc. The parameters in a bucket can be retrieved based on the address associated with the bucket. For example, function table 406 can receive, from selection module 408 and as part of selection 414, an input address. Function table 406 can use the input address to retrieve the bucket and output the parameters as well as the input boundary value stored in the retrieved bucket to arithmetic module 404.

The number of buckets as well as the base value for each bucket in function table 406 can be determined in an iterative process based on, for example, an upper limit on the errors introduced by the extrapolation operations, an upper limit on the total number of buckets, etc. For example, to begin with, the input range of a function represented by function table 406 can be divided into N input subranges. A mid-point of input subrange can be selected as a base value to evaluate the function. An average approximation error for an input subrange, defined by an upper input boundary and a lower input boundary, can be computed based on the following equation:

$$\text{Error} = \frac{\int_{lower\ input\ boundry}^{upper\ input\ boundary}(f(\text{mid\_x}) - f\_\text{app}(x))dx}{\text{upper input boundary} - \text{lower input boundary}} \quad \text{(Equation 9)}$$

In Equation 9, an average approximation error ("Error") for an input subrange between an upper input boundary and a lower input boundary of the input subrange can be determined by finding an absolute difference between the function f(x) evaluated at a mid-point of the input subrange (mid_x) and an approximation value f_app(x) of an input value x, and integrating the absolute difference with respect to x. In some examples, the absolute difference can be scaled by a probability of x prior to integration. The approximation value f_app(x) can be determined based on an extrapolation using a set of parameters such as, for example, slope, Taylor series expansion, etc., based on Equations 5-8 as described above. The integration result can be divided by the size of the input subrange (represented by difference between upper input boundary and lower input boundary) to obtain the average approximation error for the input subrange.

The average approximation error for each input subrange can be computed, and an aggregate error for a given number of buckets/input subranges can be determined by summing the average approximate error for each input subrange. A set of aggregate errors for a set of number of buckets can be computed, and a relationship between aggregate errors and number of buckets can be obtained. The number of buckets can be selected based on the relationship and based on, for example, an upper limit on the aggregate error introduced by the extrapolation operations, an upper limit on the total number of buckets, etc. For example, a minimum number of buckets needed to achieve a target aggregate error can be determined from the relationship. As an illustrative example, in a case where the function is an exponential function, the target aggregate error can be +/−0.5%.

In some examples, the base values for each input subrange/bucket that contribute to a minimum aggregate error can also be determined in the iterative process. For example, as described above, the base values can be set as mid-point of each input subrange ("x_mid") for computation of an initial aggregate error for a number of input subranges/buckets. For that number of input subranges/buckets, additional iterations can be further performed by moving the base values towards the lower input boundary or towards the upper input boundary based on the pseudocodes below:

x_upper_half=(x_mid+upper_input_boundary)/2;
x_lower_half=(x_mid+lower_input_boundary)/2;
if (aggregate_error (x_upper_half))<(aggregate_error (x_lower_half)) then x_mid=x_upper_half;
else x_mid=x_lower_half;

In the pseudocodes above, for each input subrange, the base value (represented by "x_mid") can be moved towards the upper input boundary by finding an average before the mid-point and the upper_input_boundary ("x_upper_half"), and a first aggregate error ("aggregate_error(x_upper_half)") with the base value set at x_upper_half can be determined. A second aggregate error ("aggregate_error (x_lower_half)") with the base value set at x_lower_half can also be determined. If the first aggregate error is smaller than the second aggregate error, the base value can be set at x_upper_half, otherwise the base value can be set at x_lower_half.

The recalculation of the aggregate error can be repeated for each number of buckets to determine a revised relationship between the aggregate error and number of buckets. The number of buckets can be chosen based on the revised relationship and based on the target aggregate error (e.g., minimum number of buckets to achieve +/−0.5% error). Such arrangements can achieve reduction in the number of buckets especially for functions that exhibit high rate of change, such as exponential functions.

Figure 4B:
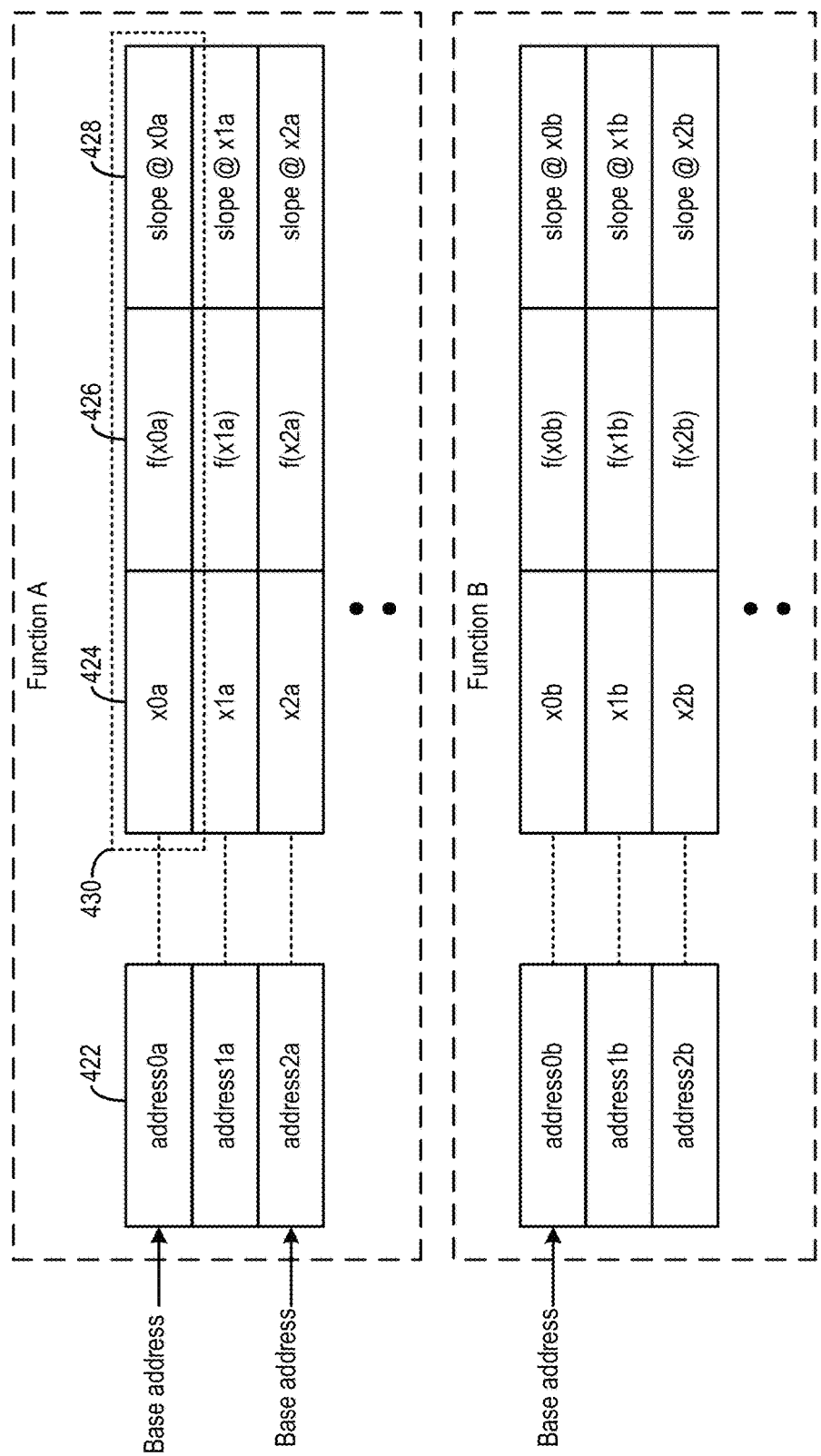

Referring back to FIG. 4A, in some examples, function table 406 can be programmed to store a mapping table for an activation function. In some other examples, as shown in FIG. 4B, function table 406 can also be programmed to store multiple mapping tables. Each mapping table can occupy a different address space that spans a different set of addresses, and each mapping table can be associated with an activation function and a set of discrete input boundary values. In some examples, the mapping tables can be associated with different activation functions for different neural network layers. In some examples, the mapping tables can also be associated with the same activation function evaluated at different sets of input boundary values for different neural network layers. For example, the different neural network layers may use the same activation function to generate the intermediate outputs, but the weighted sums output by the neural network layers may have different ranges, and each mapping table can map different sets of input boundary values corresponding to different input ranges to output values for the same activation function.

In some examples, some of addresses 422 can be designated as base addresses of blocks of buckets. A base address can be used as a reference for indexing (by adding a certain offset) into any bucket of a block of buckets associated with the base address. As to be described in details below, such arrangements provide efficiency and flexibility in programming selection module 408. Multiple addresses 422 can be designated as base addresses. For example, the address of a first bucket of a block of buckets assigned to an activation function can be designated as a base address associated with that activation function. Moreover, the address of a first bucket of a block of buckets assigned to a certain input subrange of a certain activation function can also be designated as a base address associated with that input subrange of that activation function. Different input subranges for different activation functions may be associated with different base addresses. In the illustrative example of FIG. 4A, address0a and address2a may be base addresses for function A, whereas address0b may be a base address for function B.

Selection module 408 may include logic circuits as well as a programmable memory device (e.g., a set of registers, an SRAM device, a DRAM device, non-volatile memory devices such as storage class memory (SCM), etc.). The memory device can store a selection table that contain address information of function table 406. The logic circuits can retrieve, based on function selection 410 and input value 412, address information from function table 406. Based on the address information, selection module 408 can retrieve a bucket from function table 406 and provide the parameters stored in the bucket to arithmetic module 404 for activation function computation. The address information can be programmed to reflect the most up-to-date bucket assignment in function table 406.

Figure 4C:
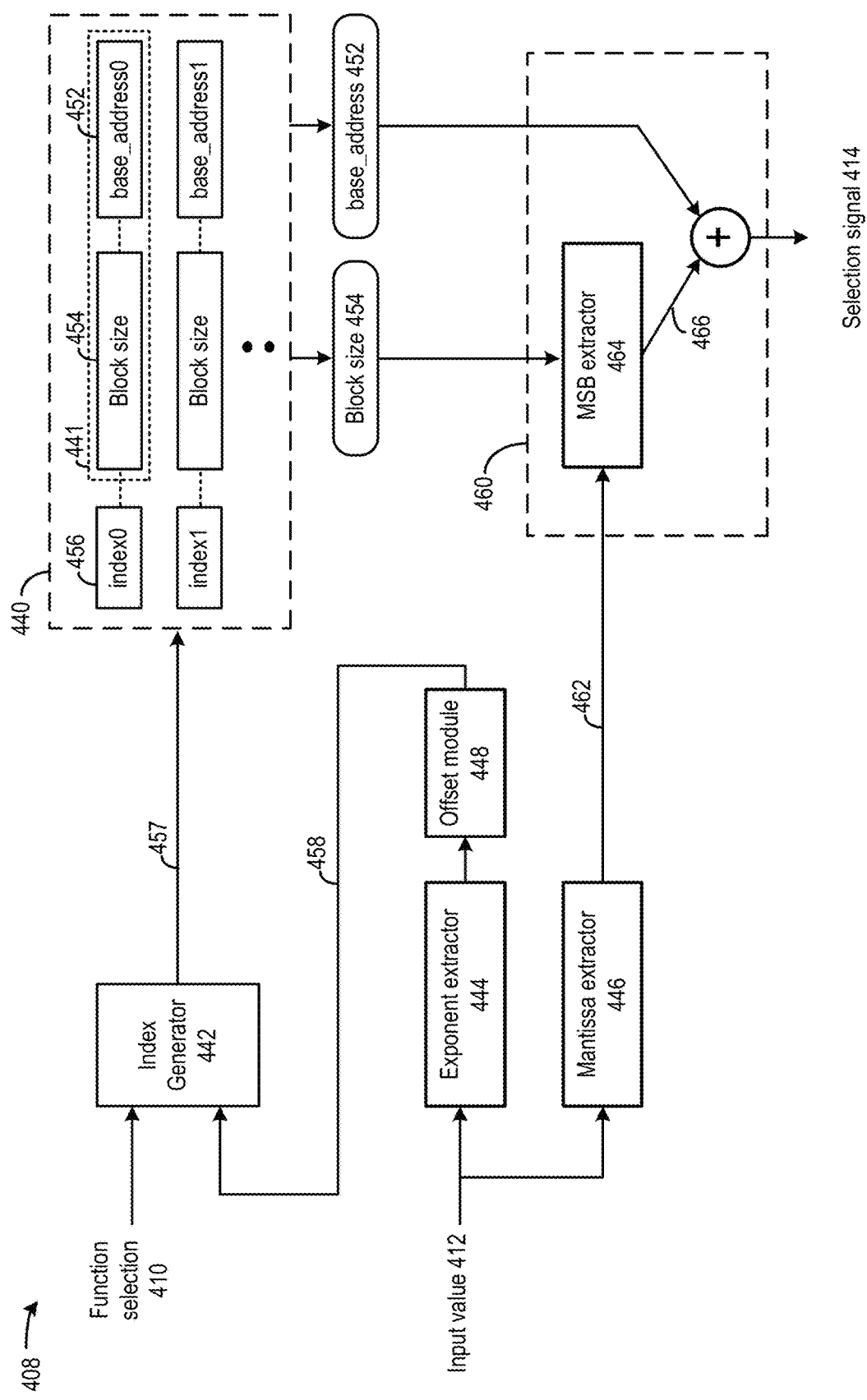

FIG. 4C illustrates an example of internal components of selection module 408. As shown in FIG. 4C, selection module 408 may include a selection table 440 as well as logic circuits including an index generator 442, an exponent extractor 444, a mantissa extractor 446, an offset module 448, and an address generator module 460.

Selection table 440 may be stored on a programmable memory device and can store a set of buckets/entries including, for example, entry 441. Each bucket in selection table 440 can represent a block of buckets in function table 406 and may store, for example, a base address (e.g., base address 452) of the block. In some examples, each bucket in selection table 440 may also store a block size (e.g., block size 454) of a block of buckets in function table 406. Each bucket in selection table 440 may be associated with an index/address (e.g., index 456), and the base address and block size information stored in a bucket of selection table 440 can be retrieved based on the associated index.

Each index in selection table 440 can reflect an activation function as well as the starting value of an input subrange associated with the block of buckets in function table 406. In a case where input value 412 is a floating number point, the starting value can of the input subrange can be represented based on the exponent of input value 412, since the exponent can provide an accurate representation of the magnitude of input value 412 and can be used to distinguish different input values for different input subranges. On the other hand, each bucket within a block of buckets can be identified based on the mantissa of input value 412, to distinguish different input values within the same input subranges.

The association between the indices and the buckets in selection table 440 may be fixed, but the content stored in the buckets can be programmed to reflect the most up-to-date bucket assignment in function table 406. Such arrangements enables efficient storage and programming of buckets block addresses information (of function table 406) in selection table 440. For example, selection table 440 needs not store each address of each buckets block of function table 406. Instead, selection table 440 only stores a base address for each buckets block and, optionally, the block size information. The hard wiring of the indices and the buckets also allow programming to be confined only in selection table 440, and that the logic circuits that generate the index needs not be programmable. All these allows selection table 440 to be programmed to track the changes in function table 406 in an efficient manner.

Index generator 442, together with exponent extractor 444 and offset module 448, can generate an index 457 in selection table 440 based on function selection 410 and input value 412. For example, based on a pre-determined format of input value 412, exponent extractor 444 can extract a subset of bits from input value 412 to form exponent 458. Optionally, offset module 448 can add an offset to the subset of bits to form exponent 458, to ensure that a value of exponent 458 is non-negative. Index generator 442 can generate index 457 based on function selection 410 and exponent 458 to extract, for example, block size 454 and base address 452 of a block of buckets of function table 406.

In addition, mantissa extractor 446 can extract mantissa 462 of input value 412, and use mantissa 462 to select a bucket within a block of buckets of function table 406 associated with base address 452. For example, as shown in FIG. 4C, address generator module 460 may include a most significant bit (MSB) extractor 464 that can extract a number of MSB bits from mantissa 462 based on block size 454. For example, if block size 454 indicates that the block includes 4 buckets, two MSBs can be extracted from mantissa 462. If block size 454 indicates that the block include 8 buckets, three MSBs can be extracted from mantissa 462. The extracted MSBs can become an offset 466, which can be added to base address 452 to obtain the address of the selected bucket. The address can then be included in selection signal 414. In some examples, block size information can be represented in log format (e.g., 4 buckets is represented by a block size value of 2, 8 buckets is represented by a block size value of 3, etc.), such that the block size information can be directly fed to MSB extractor 464 to extract the corresponding number of MSBs.

Referring back to FIG. 4A, the buckets of function table 406, as well as the buckets of selection table 440, can be programmed based on programming information 419 to implement different activation functions. Programming information 419 may be received from computation controller 330, which in turn can generate programming information 419 based on information received from a software application that interacts with apparatus 300 to perform neural network processing (e.g., software application 102 of FIG. 1). Programming information 419 can update the mathematical function parameters and/or input boundary values stored in each bucket of function table 406 to, for example, update the activation function being implemented by function table 406, to partition the buckets to change from storing a single activation function to multiple activation functions, etc. Corresponding programming can also be provided to update the content of the buckets of selection table 440 to reflect the changes in function table 406.

As an example, in a case where function table 406 is to store a single activation function for a pre-determined input range, programming information 419 can program function table 406 such that each bucket stores an input boundary value within the pre-determined input range and each bucket can be programmed to store the input boundary value, a value of the activation function at that input boundary value (which can be pre-computed by software or provided from other sources), and the slope and/or Taylor series expansion of the activation function at the input boundary value. Programming information 419 can include, for example, the input boundary value and function parameters to be stored in each bucket and the address of the bucket, which can be provided to a controller that manages the memory device of function table 406 (not shown in the figures) and the controller can program the memory device based on programming information 419.

In addition, programming information 419 also include corresponding programming information for selection module 408 to reflect the programming of function table 406. For example, in a case where function table 406 stores a single activation function associated with a particular value of function selection 410, only buckets associated with indices representing the particular value of value of function selection 410 are used to store the block size and base address information. In addition, the block size information can also be programmed to change a number of MSBs to be extracted from mantissa 471 for bucket address generation.

As another example, programming information 419 can also partition the buckets of function table 406 for multiple activation functions. For example, different consecutive blocks of buckets can be assigned to different activation functions, which can be reflected in the mapping among the addresses, the input boundary values, and the parameters in programming information 419. Programming information 419 also include corresponding programming information for selection module 408 to support multiple activation functions in function table 406. For example, selection table 440 can be programmed to store block sizes and base addresses for different functions at different buckets, with the indices of the buckets representing different functions and different input subranges. The block size information can also be programmed to change a number of MSBs to be extracted from mantissa 471 for bucket address generation.

As described above, the choice between storing a single activation table and storing multiple activation tables in function table 406 can be based on a trade-off between speed and accuracy. For example, to improve accuracy, a single activation function can be stored in function table 406 where a larger number of buckets of function table 406 can be used to store more fine-grained input boundary values and the associated function parameters of the single activation function. By quantizing an input value using the more fine-grained input boundary values, quantization error can be reduced, and the accuracy of estimating the activation function for the input value can be improved. In a case where accuracy can be reduced, function table 406 can be partitioned among a plurality of activation functions, with each partition to store a reduced number of coarse-grained input boundary values and the associated function parameters of an activation function. Storing a plurality of activation functions in the mapping table can improve the processing speed by, for example, avoiding or reducing the delays in loading a new activation function for different neural network layers, which can be leveraged for certain applications which have relaxed requirements for accuracy. As an illustrative example, an image recognition application may have relaxed requirements for accuracy but have tight requirement for speed. The image recognition application can control computer controller 330 to program activation engine 326 to store multiple activation functions to reduce the time spent in transitioning from one neural network layer operation to another neural network operation. As another illustrative example, a self-driving vehicle application may have tight requirements for accuracy (e.g., due to safety concerns) and can control computer controller 330 to program activation engine 326 to store a single activation function for one neural network operation, to maximize the accuracy of activation function processing.

Figure 4D:
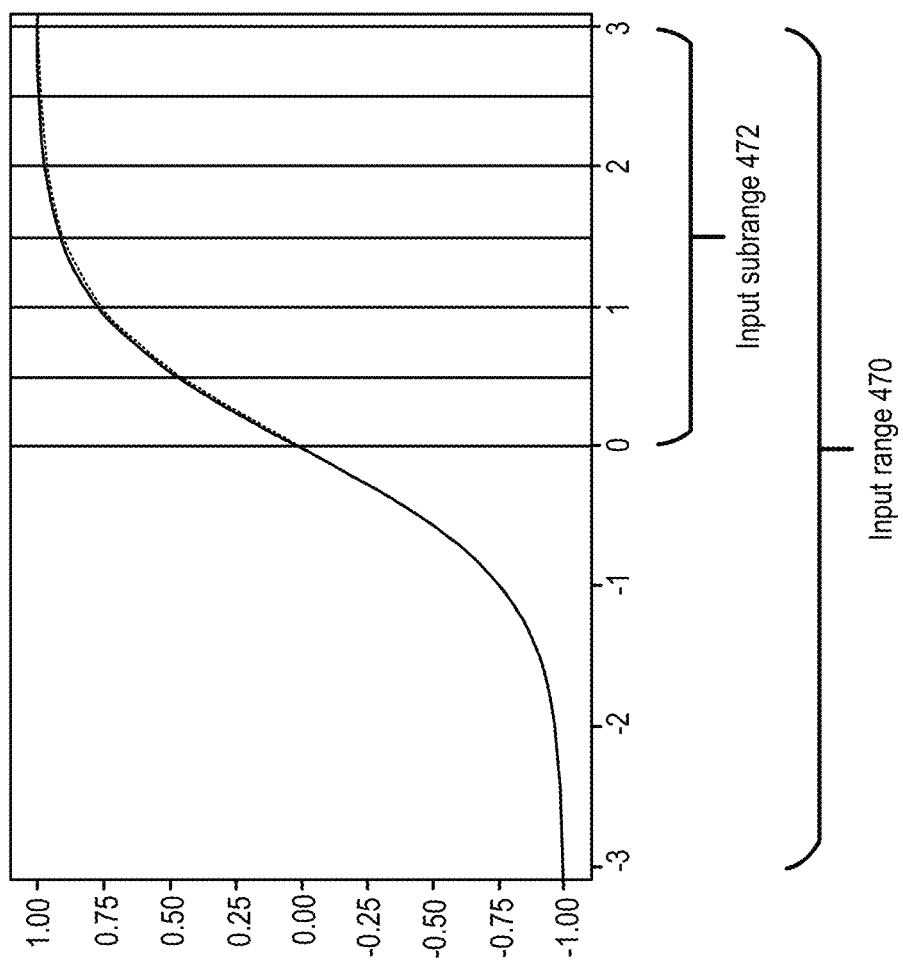

In addition, various techniques can be employed for the mapping between input boundary values and the mathematical function parameters at function table 406 to further improve the accuracy of activation function processing. For example, referring to FIG. 4D, in a case where the activation function is symmetrical or anti-symmetrical over an input range 470, function table 406 can be programmed to store only the input boundary values and function parameters for half of the input range (e.g., input subrange 472). Such arrangements allow the entries of function table 406 allocated to that activation function to be distributed within half of the input range, which can result in more fine-grained input boundary values (and lower quantization errors) than the case where the entries are distributed within the full input range, and accuracy can be improved. In addition, index generator 442 can be configured to ignore the sign of input value 412 and map input data having the same magnitude but opposite signs to the same address in function table 406. In a case where the activation function is anti-symmetric as shown in FIG. 4D, index generator 442 can forward the sign information to arithmetic module 404, which can then add the sign information to data output 420.

Figure 4E:
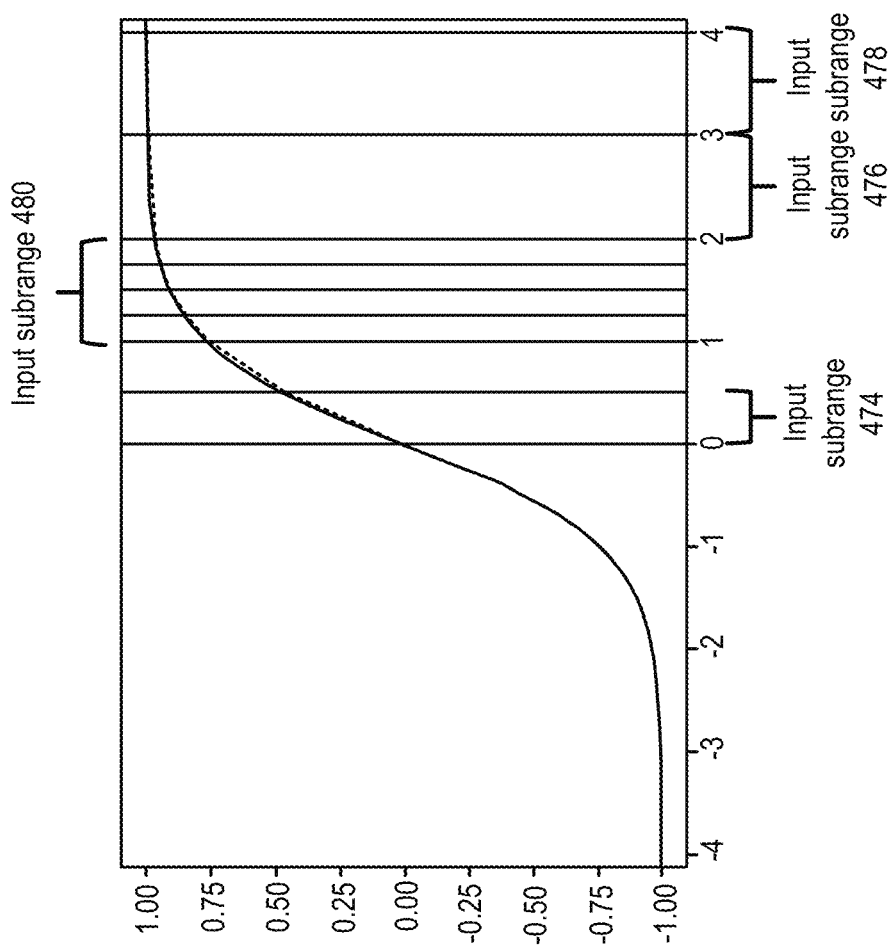

As another example, function table 406 can also be programmed to implement non-uniform quantization, where the step size between adjacent input boundary values is different from different input subranges. The distribution of the input boundary values can be determined based on, for example, a degree of linearity as well as a degree of change of the activation function for a particular input subrange. A degree of linearity can reflect whether the slope of the activation function is a constant or is changing within that input subrange. A high degree of linearity means the slope of the activation function remains constant, whereas a low degree of linearity means the slope of the activation function changes. Referring to FIG. 4E, to improve the accuracy of extrapolation based on slope and/or Taylor series coefficients, input boundary values can be more sparsely distributed for input subranges where the activation function is relatively linear (e.g., input subrange 474) and where the activation function experiences very small change with respect to input (e.g., input subranges 476 and 478). On the other hand, for input subrange 480, the activation function is relatively non-linear and the input boundary values can be more densely distributed within input subrange 480 to improve the accuracy of extrapolation and the resultant activation processing result.

In some examples, the non-uniform distribution of the input boundary values of FIG. 4E can be implemented in function table 406 and in selection module 408. For example, the mapping between the addresses and the input boundary values can be configured such that certain input subrange (e.g., input subrange 480) is mapped to a larger number of addresses (and buckets) than another input subrange (e.g., input subrange 476) having the same or similar numeric range in function table 406. The base addresses stored in selection table 440 of selection module 408 can also be set to reflect the non-uniform mapping between addresses and input boundary values in function table 406. Both function table 406 and selection table 440 can be programmed to implement the non-uniform quantization scheme based on programming information 419.

Figure 4F:
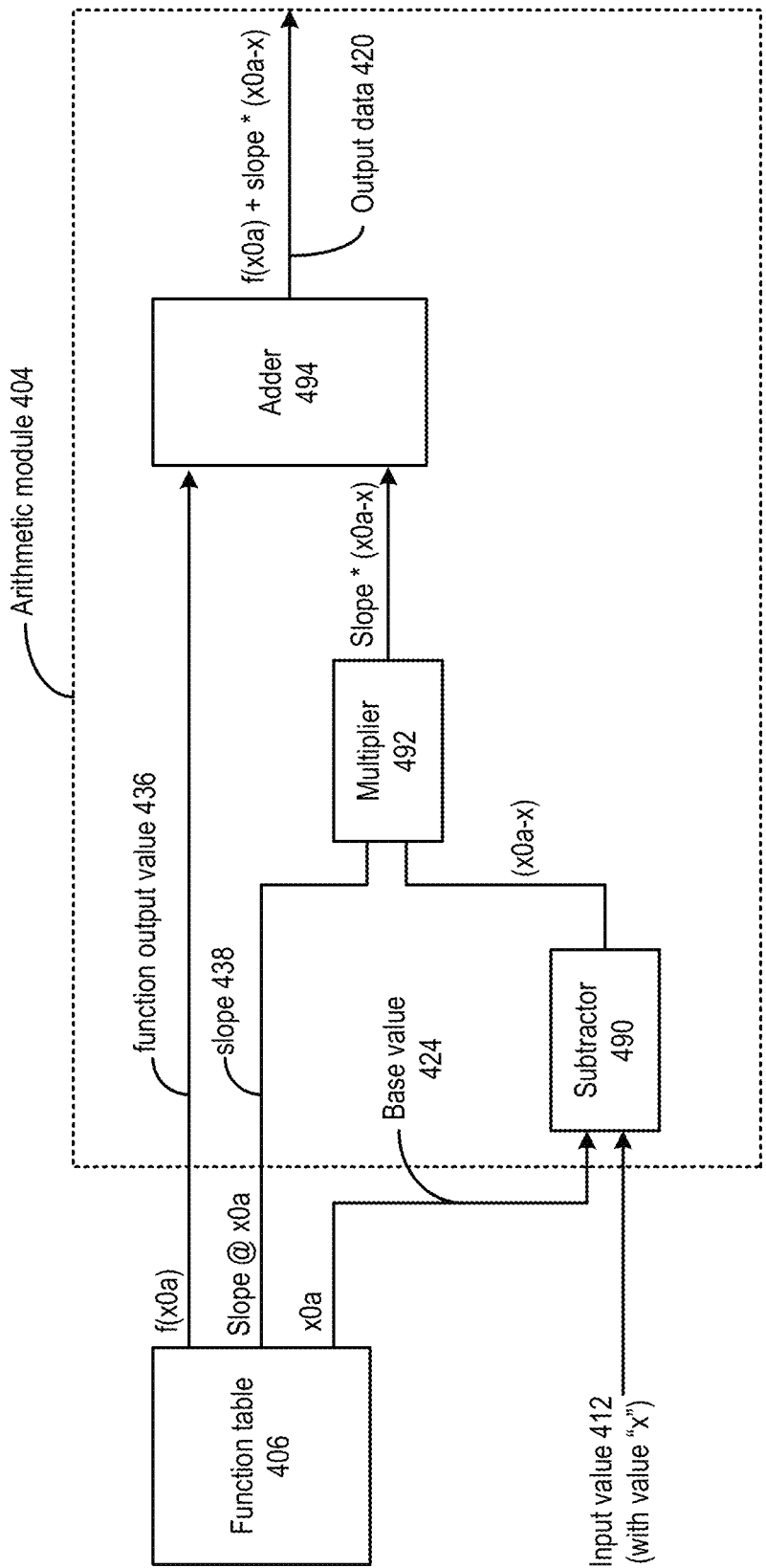
Figure 4G:
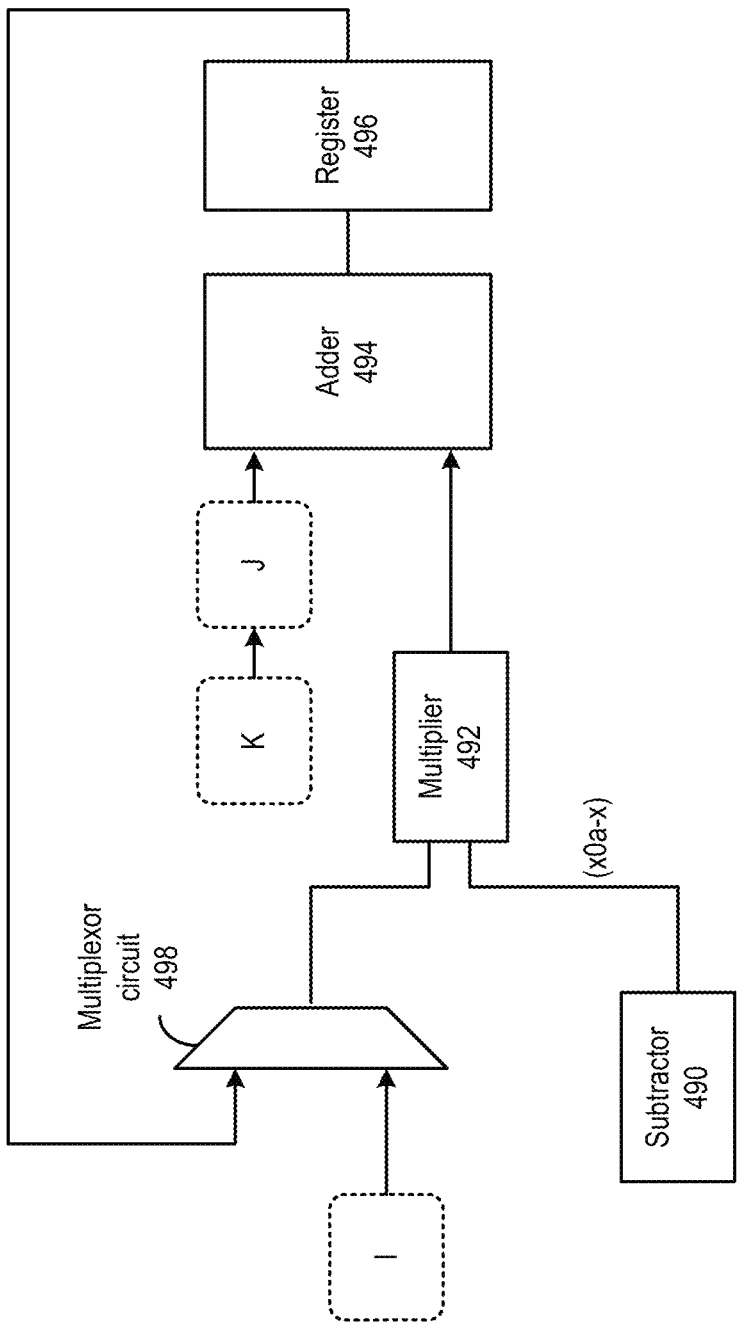

FIG. 4F and FIG. 4G illustrate examples of internal components of arithmetic module 404. As shown in FIG. 4F, arithmetic module 404 may include a subtractor 490, a multiplier 492, and an adder 494. Arithmetic module 404 may receive an input boundary value and function parameters from function table 406 based on selection signal 414 from selection module 408, as described above. For example, as shown in FIG. 4F, selection signal 414 may include address 422 to select bucket 430, and function table 406 can output base value 424 (denoted as "x0a" in FIG. 4F), function output value 426 (denoted as "f(x0a)"), and slope 428 (denoted as "slope @ f(x0a)") to arithmetic module 404. Arithmetic module 404 can perform an extrapolation operation based on base value 424, function output value 426, and slope 428 based on, for example, Equation 5 as described above. For example, subtractor 490 can determine a difference between input value 412 (with value "x") and base value 424 as x0a−x. Multiplier 492 can multiply the difference (x0a−x) with slope 428 to estimate the change of the activation function between at base value 424 and at input value 412. Adder 494 can add the change to function output value 426 to generate output data 420.

FIG. 4G illustrates additional internal components of arithmetic module 404 that can support the extrapolation operations using Taylor series expansion coefficients based on Equation 8. As shown in FIG. 4G, in addition to subtractor 490, multiplier 492, and adder 494, arithmetic module 404 may further include a register 496 and a multiplexor circuit 498 to perform arithmetic operations according to Equation 8 in multiple iterations. For example, in a first iteration, multiplexor circuit 498 can be configured to pass parameter I (Taylor series coefficient $S^3(x0a)/6$) to multiplier 492, which also receives the difference $\Delta$ (the difference between input x and input boundary value x0a from subtractor 490. Multiplier 492 can generate a first multiplication product I×Δ. Adder 494 can add the parameter J (Taylor series coefficient $S^2(x0a)/2$) to the first multiplication product to obtain a first sum I×Δ+J, and the first sum can be stored in register 496. In the second iteration, the first sum stored in register 496 can be forwarded, by multiplexor circuit 498, to multiplier 492, which can multiply the first sum with the difference Δ to generate a second multiplication product (I×Δ+J)×Δ. Adder 494 can add the parameter K (Taylor series coefficient $S^1$ (x0a)) to the second multiplication product to generate a second sum (I×Δ+J)×Δ+K, and the second sum can be stored in register 496 (and replace the first sum). In the third iteration, the second sum stored in register 496 can be forwarded, by multiplexor circuit 498, to multiplier 492, which can multiply the second sum with the difference Δ to generate a third multiplication product ((I×Δ+J)×Δ+K)×Δ. Adder 494 can forward the third multiplication product as output data 420.

Figure 5:
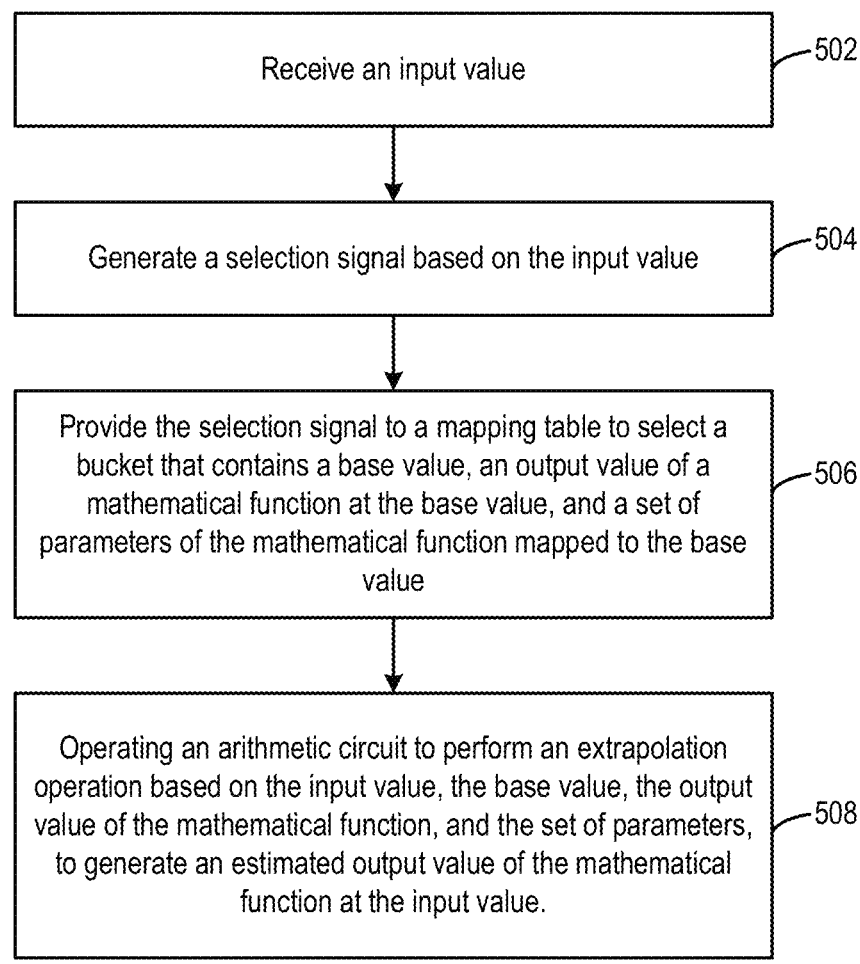
FIG. 5 illustrates an example flow diagram of performing hardware-based mathematical function processing of data, according to certain aspects of the present disclosure.

FIG. 5 illustrates an example flow diagram of a process 500 for performing hardware-based mathematical function processing. Process 500 can be performed by, for example, various internal components of activation engine 326 as described in FIG. 4A-FIG. 4G including, for example, arithmetic module 404, function table 406, and selection module 408, and may include the techniques described above.

At operation 502, selection module 408 receives an input value. The input value can be received from, for example, computing engine 324, and can comprise a weighted sum of inputs. In some examples, the input value can be a floating point number. In some examples, the input value can be extracted as an exponent of the floating point number.

At operation 504, selection module 408 generates a selection signal based on the input value. The selection signal may include an input address of the mapping table (e.g., function table 406). The generation of the selection signal including the address may include selecting, from a selection table (e.g., selection table 440), a base address, and a block size of a buckets block of function table 406. The selection signal can be based on generating an index based on an exponent of the input value. An offset to the base address can also be determined based on a mantissa of the input value and the block size. The input address of function table 406 can be determined by adding the offset to the base address, and the input address can be included in the selection signal.

At operation 506, selection module 408 can provide the selection signal to a mapping table (e.g., function table 406) to select a bucket that contains a base value, an output value of a mathematical function at the base value, and a set of parameters of the mathematical function mapped to the base value. Function table 406 may include a plurality of buckets, with each bucket being associated with an address and stores a base value, an output value of a mathematical function at the base value, and a set of parameters of the mathematical function mapped to the base value. The base values can be input boundary values that span an input range of the mathematical function (e.g., an activation function). The distribution of the input boundary values can be based on the techniques described above including, for example, FIG. 4D and FIG. 4E. The set of parameters may include, for example, a slope of the mathematical function at the base value, a Taylor series expansion of the mathematical function evaluated at the base value, etc.

At operation 508, arithmetic circuit 404 can be operated to perform an extrapolation operation based on the input value, the base value, the output value of the mathematical function at the base value, and the set of parameters, to generate an estimated output value of the mathematical function at the input value based on Equations 6-8 as described above. Arithmetic circuit 404 may include a subtractor (e.g., subtractor 490), a multiplier (e.g., multiplier 492), and an adder (e.g., adder 494) to perform the extrapolation operation. For example, subtractor 490 can determine a difference between the input value and the base value. Multiplier 492 can multiply the difference with a slope included in the set of parameters to estimate the change of the activation function between the base value and the input value. Adder 494 can add the change to the output value of the mathematical function output value at the base value to generate the estimated output value of the mathematical function at the input value. In some examples, arithmetic circuit 404 can perform multiple iterations of multiplications and additions, as described in FIG. 4G, to generate the estimated output value.

Figure 6:
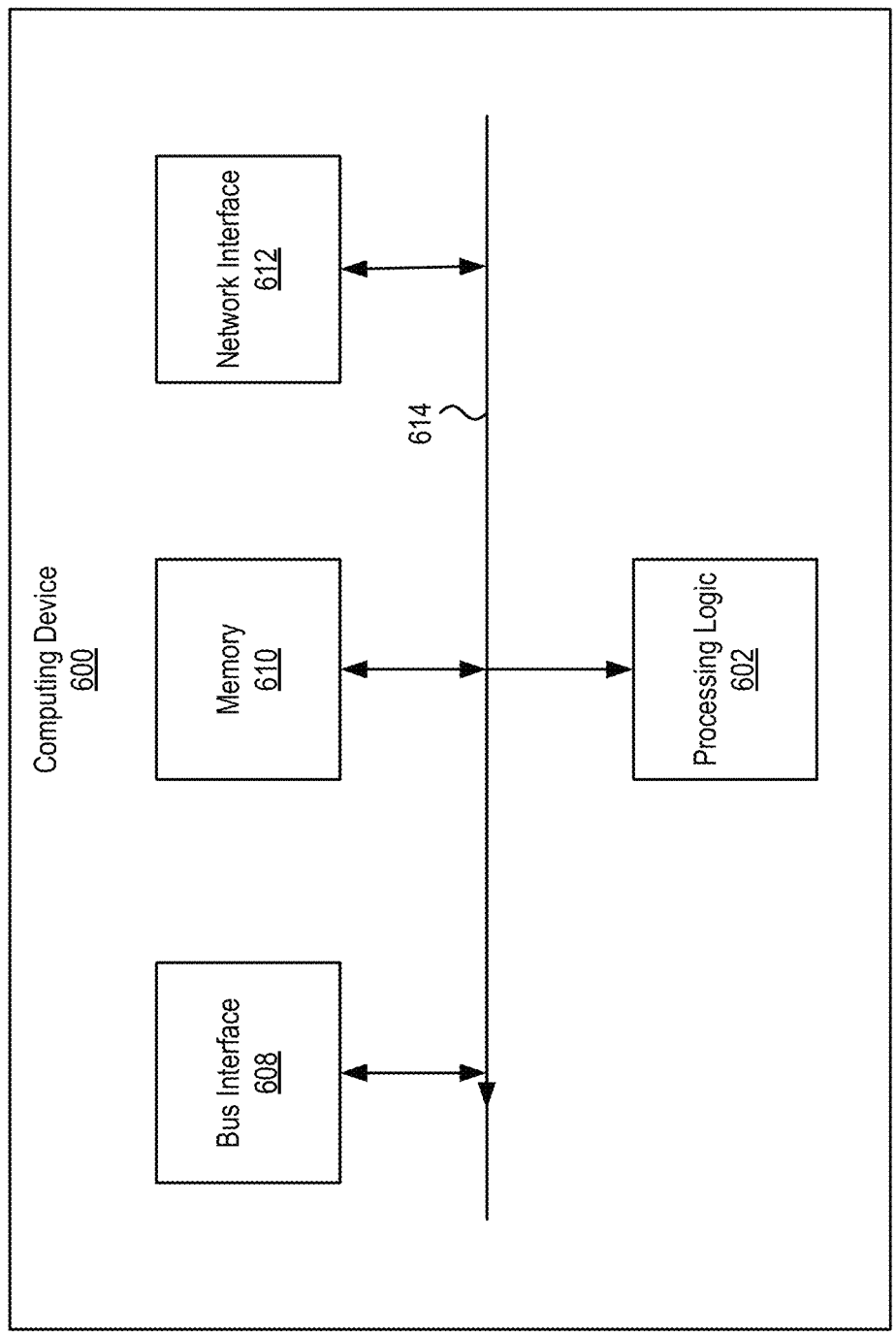
FIG. 6 illustrates an example of a computing device, according to certain aspects of the disclosure.

FIG. 6 illustrates an example of a computing device 600. Functionality and/or several components of the computing device 600 may be used without limitation with other embodiments disclosed elsewhere in this disclosure, without limitations. A computing device 600 may perform computations to facilitate processing of a task. As an illustrative example, computing device 600 can be part of a server in a multi-tenant compute service system. Various hardware and software resources of computing device 600 (e.g., the hardware and software resources associated with provision of an image recognition service) can be allocated to a client upon request.

In one example, the computing device 600 may include processing logic 602, a bus interface module 608, memory 610, and a network interface module 612. These modules may be hardware modules, software modules, or a combination of hardware and software. In certain instances, modules may be interchangeably used with components or engines, without deviating from the scope of the disclosure. The computing device 600 may include additional modules, not illustrated here. In some implementations, the computing device 600 may include fewer modules. In some implementations, one or more of the modules may be combined into one module. One or more of the modules may be in communication with each other over a communication channel 614. The communication channel 614 may include one or more busses, meshes, matrices, fabrics, a combination of these communication channels, or some other suitable communication channel.

The processing logic 602 may include one or more integrated circuits, which may include application specific integrated circuits (ASICs), field programmable gate arrays (FPGAs), systems-on-chip (SoCs), network processing units (NPUs), processors configured to execute instructions or any other circuitry configured to perform logical arithmetic and floating point operations. Examples of processors that may be included in the processing logic 602 may include processors developed by ARM®, MIPS®, AMD®, Intel®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 602 may be stored on a computer-readable storage medium, for example, in the form of a computer program. The computer-readable storage medium may be non-transitory. In some cases, the computer-readable medium may be part of the memory 610. Processing logic 602 may also include hardware circuities for performing artificial neural network computation including, for example, neural network processor(s) 306, etc.

The access to processing logic 602 can be granted to a client to provide the personal assistant service requested by the client. For example, computing device 600 may host a virtual machine, on which an image recognition software application can be executed. The image recognition software application, upon execution, may access processing logic 602 to predict, for example, an object included in an image. As another example, access to processing logic 602 can also be granted as part of bare-metal instance, in which an image recognition software application executing on a client device (e.g., a remote computer, a smart phone, etc.) can directly access processing logic 602 to perform the recognition of an image.

The memory 610 may include either volatile or non-volatile, or both volatile and non-volatile types of memory. The memory 610 may, for example, include random access memory (RAM), read only memory (ROM), Electrically Erasable Programmable Read-Only Memory (EEPROM), flash memory, and/or some other suitable storage media. In some cases, some or all of the memory 810 may be internal to the computing device 600, while in other cases some or all of the memory may be external to the computing device 600. The memory 610 may store an operating system comprising executable instructions that, when executed by the processing logic 602, provides the execution environment for executing instructions providing networking functionality for the computing device 600. The memory 610 may also store, for example, software applications for performing artificial neural network computation. For example, memory 610 may store software routines related to the computations of the equations above. In a case where processing logic 602 is in the form of FPGA, memory 610 may store netlists data representing various logic circuit components of processing logic 602. In some examples, memory 610 can include memory 312.

The bus interface module 608 may enable communication with external entities, such as a host device and/or other components in a computing system, over an external communication medium. The bus interface module 608 may include a physical interface for connecting to a cable, socket, port, or other connection to the external communication medium. The bus interface module 608 may further include hardware and/or software to manage incoming and outgoing transactions. The bus interface module 608 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 608 may include the physical layer for any of these bus protocols, including a connector, power management, and error handling, among other things. In some implementations, the computing device 600 may include multiple bus interface modules for communicating with multiple external entities. These multiple bus interface modules may implement the same local bus protocol, different local bus protocols, or a combination of the same and different bus protocols.

The network interface module 612 may include hardware and/or software for communicating with a network. This network interface module 612 may, for example, include physical connectors or physical ports for wired connection to a network, and/or antennas for wireless communication to a network. The network interface module 612 may further include hardware and/or software configured to implement a network protocol stack. The network interface module 612 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 600 may include multiple network interface modules, each configured to communicate with a different network. For example, in these implementations, the computing device 600 may include a network interface module for communicating with a wired Ethernet network, a wireless 802.11 network, a cellular network, an Infiniband network, etc. In some embodiments, computing device 600 may receive a set of parameters, such as the aforementioned weight vectors for generation of forget gate factor, input factor, output factor, etc. from a server through network interface module 612.

The various components and modules of the computing device 600, described above, may be implemented as discrete components, as a System on a Chip (SoC), as an ASIC, as an NPU, as an FPGA, or any combination thereof. In some embodiments, the SoC or other components may be communicatively coupled to another computing system to provide various services such as traffic monitoring, traffic shaping, computing, etc. In some embodiments of the technology, the SoC or other components may include multiple subsystems as disclosed herein.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 6 and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system comprising:
   a first circuit configured to store input boundary values and parameters related to a mathematical function, wherein each input boundary value of the input boundary values is associated with a subset of the parameters that includes one or more slope values of the mathematical function at the input boundary value and an output value of the mathematical function at the input boundary value; and
   a second circuit configured to:
      receive an input value;
      receive, from the first circuit and based on the input value, a first input boundary value and first parameters associated with the first input boundary value; and
      compute, based on a relationship between the input value and the first input boundary value, and based on the first parameters, an output value of the mathematical function at the input value.

2. The system of claim 1, wherein the second circuit comprises a subtraction circuit, a multiplier circuit, and an adder circuit.

3. The system of claim 2, wherein the one or more slope values comprise a single slope value;
   wherein the subtraction circuit is configured to generate a difference result between the input value and the input boundary value;
   wherein the multiplier circuit is configured to generate a multiplication result between the difference result and the single slope value of the mathematical function at the first input boundary value; and
   wherein the adder circuit is configured to generate the output value of the mathematical function at the input value based on adding the multiplication result to an output value of the mathematical function at the first input boundary value.

4. The system of claim 2, wherein the one or more slope values comprise a first Taylor series coefficient, a second Taylor series coefficient, and a third Taylor series coefficient;
   wherein the second circuit comprises a register;
   wherein, in a first time:
      the subtraction circuit is configured to generate a difference result between the input value and the input boundary value;
      the multiplier circuit is configured to generate a first multiplication result between the difference result and the first Taylor series coefficient of the mathematical function at the first input boundary value;
      the adder circuit is configured to generate a first intermediate output based on adding the first multiplication result to the second Taylor series coefficient of the mathematical function at the first input boundary value; and
      the register is configured to store the intermediate output; and
   wherein, in a second time:
      the multiplier circuit is configured to generate a second multiplication result between the difference result and the first intermediate output; and
      the adder circuit is configured to generate a second intermediate output based on adding the second multiplication result to the third Taylor series coefficient; and
   wherein the output value of the mathematical function at the input value is generated based on the second intermediate output and an output value of the mathematical function at the first input boundary value.

5. The system of claim 1, wherein the input boundary values span a numerical range for the mathematical function; and
   wherein the input boundary values are unevenly distributed within the numerical range.

6. The system of claim 5, wherein a separation between adjacent input boundary values is determined based on a degree of linearity of the mathematical function between the adjacent input boundary values.

7. The system of claim 1, wherein the mathematical function is symmetrical or anti-symmetrical between a first input subrange and a second input subrange; and
   wherein the input boundary values are defined based on the first input subrange.

8. The system of claim 1, wherein the first circuit comprises a hardware mapping table including a plurality of buckets, each bucket of the plurality of buckets being associated with an address and configured to store an input boundary value and parameters related to the mathematical function associated with the input boundary value.

9. The system of claim 8, wherein the second circuit comprises a selection module configured to select a bucket of the plurality of buckets based on generating an address associated with the selected bucket based on the input value; and
   wherein the second circuit is configured to generate the output value of the mathematical function at the input value based on the first input boundary value and the first parameters stored in the selected bucket.

10. The system of claim 9, wherein the plurality of buckets are organized into a plurality of blocks of buckets, each block of buckets having a base address associated with a first bucket of the block of buckets;
   wherein the selection module comprises:
      a selection table that associates a plurality of bases addresses with a plurality of block sizes of the blocks of buckets; and a processing circuit configured to:
retrieve, based on a first part of the input value, a first base address and a first block size from the selection table;
determine an address of the selected bucket based on the first base address, a second part of the input value, and the first block size; and
provide the address to the hardware mapping table to select the bucket.

11. The system of claim 10, wherein the first part of the input value comprises an exponent of the input value; and
wherein the second part of the input value comprises a mantissa of the input value.

12. The system of claim 11, wherein the processing circuit is configured to:
extract a number of most significant bits (MSBs) from the mantissa of the input value based on the first block size, and
generate the address based on adding the extracted MSBs to the first base address.

13. The system of claim 10, wherein:
the mathematical function is a first mathematical function;
the input boundary values are first input boundary values;
the parameters are first parameters; and
wherein the first circuit is configured to store second input boundary values and second parameters related to a second mathematical function, and to associate the second input boundary values with the second parameters; and
wherein the second circuit is configured to receive a selection of one of the first mathematical function or the second mathematical function and compute the output value based on the selection.

14. The system of claim 13, further comprising a computing engine configured to perform arithmetic operations for a first neural network layer to generate a first weighted sum and to perform arithmetic operations for a second neural network layer to generate a second weighted sum;
wherein, at a first time:
the first circuit is programmed, based on first programming information, to store a first plurality of input boundary values and first parameters related to a first activation function; and
the second circuit is configured to generate a first output value of processing of the first weighted sum with the first activation function for the first neural network layer; and
wherein, at a second time:
the first circuit is programmed, based on second programming information, to store a second plurality of input boundary values and second parameters related to a second activation function; and
the second circuit is configured to generate a second output value of processing of the second weighted sum with the second activation function for the second neural network layer.

15. A method comprising:
storing, at a first circuit, input boundary values and parameters related to a mathematical function, wherein each input boundary value of the input boundary values is associated with a subset of the parameters that includes one or more slope values of the mathematical function at the input boundary value and an output value of the mathematical function at the input boundary value;
receiving, at a second circuit, an input value;
receiving, at the second circuit from the first circuit, a first input boundary value and first parameters associated with the first input boundary value; and
computing, based on a relationship between the input value and the first input boundary value, and based on the first parameters, an output value of the mathematical function at the input value.

16. The method of claim 15, wherein the one or more slope values comprise a single slope value; and
wherein the method further comprises:
generating a difference result between the input value and the input boundary value;
generating a multiplication result between the difference result and the single slope value of the mathematical function at the first input boundary value; and
generating the output value of the mathematical function at the input value based on adding the multiplication result to an output value of the mathematical function at the first input boundary value.

17. The method of claim 15, wherein the one or more slope values comprise a first Taylor series coefficient, a second Taylor series coefficient, and a third Taylor series coefficient;
wherein the method comprises, in a first time:
generating a difference result between the input value and the input boundary value;
generating a first multiplication result between the different result and the first Taylor series coefficient of the mathematical function at the first input boundary value;
generating a first intermediate output based on adding the first multiplication result to the second Taylor series coefficient of the mathematical function at the first input boundary value;
and in a second time:
generating a second multiplication result between the difference result and the first intermediate output; and
generating a second intermediate output based on adding the second multiplication result to the third Taylor series coefficient; and
generating the output value of the mathematical function at the input value based on the second intermediate output and an output value of the mathematical function at the first input boundary value.

18. The method of claim 15, wherein the input boundary values span a numerical range for the mathematical function; and
wherein the input boundary values are unevenly distributed within the numerical range.

* * * * *